US009852399B1

United States Patent
Casale et al.

(10) Patent No.: US 9,852,399 B1
(45) Date of Patent: *Dec. 26, 2017

(54) METHODS FOR USING INTERACTIVE HUDDLE SESSIONS AND SUB-APPLICATIONS

(71) Applicant: MASSACHUSETTS MUTUAL LIFE INSURANCE COMPANY, Springfield, MA (US)

(72) Inventors: Robert Casale, Bristol, CT (US); Abigail O'Malley, Brighton, MA (US); Kedzie Teller, Brookline, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 207 days.

This patent is subject to a terminal disclaimer.

(21) Appl. No.: 14/733,282

(22) Filed: Jun. 8, 2015

Related U.S. Application Data

(60) Provisional application No. 62/008,916, filed on Jun. 6, 2014, provisional application No. 62/008,888, filed on Jun. 6, 2014, provisional application No. 62/008,896, filed on Jun. 6, 2014, provisional application No. 62/008,937, filed on Jun. 6, 2014, provisional application No. 62/008,948, filed on Jun. 6, 2014.

(51) Int. Cl.
*G06F 3/0481* (2013.01)
*G06Q 10/10* (2012.01)
*H04L 29/08* (2006.01)
*H04L 29/06* (2006.01)

(52) U.S. Cl.
CPC ......... *G06Q 10/103* (2013.01); *G06F 3/0481* (2013.01); *H04L 65/403* (2013.01); *H04L 67/10* (2013.01)

(58) Field of Classification Search
CPC ... G06F 3/0481; G06Q 10/103; H04L 65/403; H04L 67/10
See application file for complete search history.

(56) References Cited

U.S. PATENT DOCUMENTS

| 7,062,511 | B1 | 6/2006 | Poulsen |
| 7,802,207 | B2 | 9/2010 | Agboatwalla et al. |
| 7,827,494 | B1 | 11/2010 | Hedayatpour et al. |
| 8,072,439 | B2 | 12/2011 | Hillis et al. |

(Continued)

*Primary Examiner* — Anil Bhargava
(74) *Attorney, Agent, or Firm* — Eric L. Sophir; Dentons US LLP

(57) ABSTRACT

Systems and methods for user interaction with sub-applications in a remote huddle session are disclosed. The system architecture of the disclosed system and methods may include a plurality of components including servers, databases, client computing devices, and software modules, among others. The components may interact with each other by means of network connections. The user interaction with a plurality of sub-applications is also disclosed. An authenticated team member may select a sub-application from a list of sub-applications on a home screen that may be displayed on the user interface of a client computing device by a processor. The list of sub-applications may include recognition, morale, announcements, news feed, key protects, field metrics, dates/calendar, leader standard work, employee sentiment, and customer sentiment, among others.

14 Claims, 18 Drawing Sheets

(56) References Cited

U.S. PATENT DOCUMENTS

| | | |
|---|---|---|
| 8,181,115 B2 | 5/2012 | Irving |
| 9,594,823 B2 | 3/2017 | Chaney et al. |
| 2003/0046401 A1* | 3/2003 | Abbott .................. G06F 9/4443 709/228 |
| 2007/0240063 A1 | 10/2007 | Cheng et al. |
| 2009/0204906 A1* | 8/2009 | Irving ..................... H04N 7/15 715/753 |
| 2010/0070881 A1* | 3/2010 | Hanson .............. G06Q 10/0631 715/753 |
| 2010/0192072 A1 | 7/2010 | Spataro et al. |
| 2011/0022991 A1* | 1/2011 | Hillis .................. G06F 3/04883 715/863 |
| 2012/0110087 A1 | 5/2012 | Culver et al. |
| 2013/0218978 A1 | 8/2013 | Weinstein et al. |
| 2014/0282106 A1 | 9/2014 | Smith et al. |
| 2014/0282135 A1 | 9/2014 | Segre |
| 2015/0067058 A1 | 3/2015 | Vellozo Luz et al. |
| 2015/0120577 A1 | 4/2015 | Lobo et al. |
| 2015/0149929 A1 | 5/2015 | Shepherd et al. |
| 2016/0100019 A1 | 4/2016 | Leondires |

* cited by examiner

METHODS FOR USING INTERACTIVE HUDDLE SESSIONS AND SUB-APPLICATIONS

CROSS-REFERENCE TO RELATED APPLICATIONS

This application claims priority to U.S. Provisional Patent Application Ser. No. 62/008,916, filed Jun. 6, 2014, U.S. Provisional Patent Application Ser. No. 62/008,888, filed Jun. 6, 2014, U.S. Provisional Patent Application Ser. No. 62/008,896, filed Jun. 6, 2014, U.S. Provisional Patent Application Ser. No. 62/008,937, filed Jun. 6, 2014, and U.S. Provisional Patent Application Ser. No. 62/008,948, filed Jun. 6, 2014, all of which are hereby incorporated by reference in their entirety.

TECHNICAL FIELD

The present disclosure relates in general to collaboration systems and more specifically to systems and methods for remote huddle collaboration.

BACKGROUND

Conventionally, team members working on one or more projects within a company may get together in a huddle or micro-meeting on a regular basis to share information, discuss topics, evaluate performance, identify issues and/or solve problems collaboratively. Since the introduction of the huddle, whiteboards have acted as the traditional huddle tool for storing all information collected during the huddle session. However, it may not be possible for all participants in a meeting to be in the same physical location at the same time, which may create a need for modifying the current huddle methodology.

Alternatives to overcome the challenge of gathering team members at different locations for huddle may include the use of one or more collaboration tools such as conference phone calls, video conferences, internet relay chat (IRC), and instant messaging, among others. Nevertheless, the whiteboard is still the most used tool in huddle boards, because these collaboration tools are generic ways to connect people and may not offer a consistent way to be fully engaged in huddles. As a result, all team members must be physically located in the same room in order to be fully engaged in the huddle session.

Additionally, a huddle session may use a set of management tools to keep team members engaged and informed about the content, goals, updates of the huddle, among others. Furthermore, all issues discussed, graphics, charts, provided for the meeting and created during the huddle may provide valuable insight to team members and to senior management.

As remote work becomes increasingly common and in order to continue to realize the benefits of the team huddle, there is a need for systems and methods that may enable remote collaboration between team members of a given project in a virtual huddle environment. Equally important is to provide the team members in a virtual huddle with the set of tools that may make the virtual huddle at least as successful as its physical counterpart.

Conventional approaches to meetings amongst remote users fail address all of the deficiencies of the conventional collaboration tools. A web meeting may allow a user to share a computer desktop with another user in a remote location. But the user must select which application should be presented on the computer desktop, so there is no ability to present a page that has information from multiple sub-applications that are dynamically updated. Further, the user cannot include annotations overlaid on the page that are simultaneously presented to the remote user and also stored with that particular page such that the particular page can be retrieved at a later date along with those annotations.

Moreover, conventional extranets are capable of sharing information from a common source, but these extranets do not offer real-time collaboration through real-time updates and simultaneous displays to other users. Further, these conventional extranets do not utilize sub-applications that dynamically display data associated with users simultaneously accessing the extranet. Conventional computer solutions do not offer the desired collaboration, real-time updating, dynamic presentation of data, and linking of additional content to the displayed data.

SUMMARY

Disclosed herein are systems and methods for computing tools associated with a remote huddle collaboration environment is disclosed. These systems and methods may address the deficiencies discussed above, and may also provide other benefits as well. According to an embodiment, the method providing tools for a remote huddle collaboration environment may operate in a system architecture that may include different components that may dynamically interact with each other through network connections. The system may include components, such as one or more databases, a plurality of client computing devices, one or more servers, a module manager, an authentication module, a data processing module, and a sub-application module, among others. The system may also include any suitable user interface to interact with team members by means of a computing device.

In one embodiment, a computer-implemented method comprises receiving, by an authentication module of a huddle management server, a user credential of a first user transmitted from a computing device of the first user; authenticating, by the authentication module of the huddle management server, the user credential of the first user; determining, by the authentication module of the huddle management server, which huddle collaboration files are associated with the first user; granting, by the authentication module of the huddle management server, access to the first user for the huddle collaboration files associated with the first user upon authentication of the user credential; receiving, by a data processing module of the huddle management server, a selection by the user of a huddle collaboration file associated with the first user; designating, by the data processing module of the huddle management server, the selected huddle collaboration file as an active huddle; receiving, by the authentication module of the huddle management server, a user credential of a second user transmitted from a computing device of the second user; authenticating, by the authentication module of the huddle management server, the user credential of the second user; determining, by the authentication module of the huddle management server, which huddle collaboration files are associated with the second user; granting, by the authentication module of the huddle management server, access to the second user for the huddle collaboration files associated with the second user upon authentication of the user credential; determining, by the authentication module of the huddle management server, whether any of the huddle collaboration files associated with the second user are designated as an active huddle; identifying, by a data processing module of the huddle management server, at least two sub-applications associated with the selected collaboration file designated as the active huddle; instructing, by the data processing module of the huddle management server, execution of each of the at least two sub-applications associated with the selected collaboration file, wherein each of the sub-applications dynamically queries a database for data records associated with the first and second users; presenting, by the data processing module of the huddle management server, a graphical representation of the selected huddle collaboration file on the computing device of the first user, wherein the graphical representation comprises an initial view of the at least two sub-applications having a first set of information for each of the least two sub-applications simultaneously displayed in the graphical representation; simultaneously presenting, by the data processing module of the huddle management server, a synchronized version of the selected huddle collaboration file on a computing device of the second user located remotely from the computing device of the first user, wherein the graphical representation comprises the initial view of the at least two sub-applications having the first set of information for each of the least two sub-applications simultaneously displayed in the graphical representation; upon receiving a selection of one of the at least two sub-applications from the computing device of the first user or the computing device of the second user, presenting, by the data processing module of the huddle management server, a second graphical representation of the selected huddle collaboration file on the computing device of the first user, wherein the second graphical representation comprises a second view of the selected sub-application having a second set of information associated with the selected sub-application displayed in the second graphical representation; and simultaneously presenting, by the data processing module of the huddle management server, the second graphical representation of the selected huddle collaboration file on the computing device of the second user, wherein the second graphical representation comprises the second view of the selected sub-application having the second set of information associated with the selected sub-application displayed in the second graphical representation; and upon receiving input data from an input device of the computing device of the first user or the second user directed to an electronic address associated with the selected sub-application, updating, by the data processing module of the huddle management server, the database accessed by the selected sub-application and dynamically display the second graphical user interface simultaneously to the computing device of the first user and the computing device of the second user reflecting the updated database.

In another embodiment, a collaboration system comprises a data store including a description associated with a huddle board display page having at least two sub-applications and an association with more than one user, wherein the first huddle board display page has information from a first sub-application and a second sub-application, and wherein the huddle board display page has a first huddle board display page having a first link associated with an object of the information from the first sub-application for a second huddle board display page having information from a first sub-application a second link associated with an object of the information from the second sub-application for a third huddle board display page having information from a second sub-application; and a computer processor coupled to the data store and in communication through the Internet and programmed to: receive a signal indicating activation of the first or second links displayed by the first huddle board display page or the second huddle board display page, upon receiving an indication that a sub-application has been activated by a user computer in Internet communication with the first huddle board display page, serve the second huddle board display page based upon the description in the data store and with content generated by the activated sub-application, and upon receiving an input from the user computer to update information presented on the huddle board display page for a particular sub-application, serve a third huddle board display page based upon the description in the data store and content generated by any sub-applications including the input of updated information associated with the huddle board display page.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
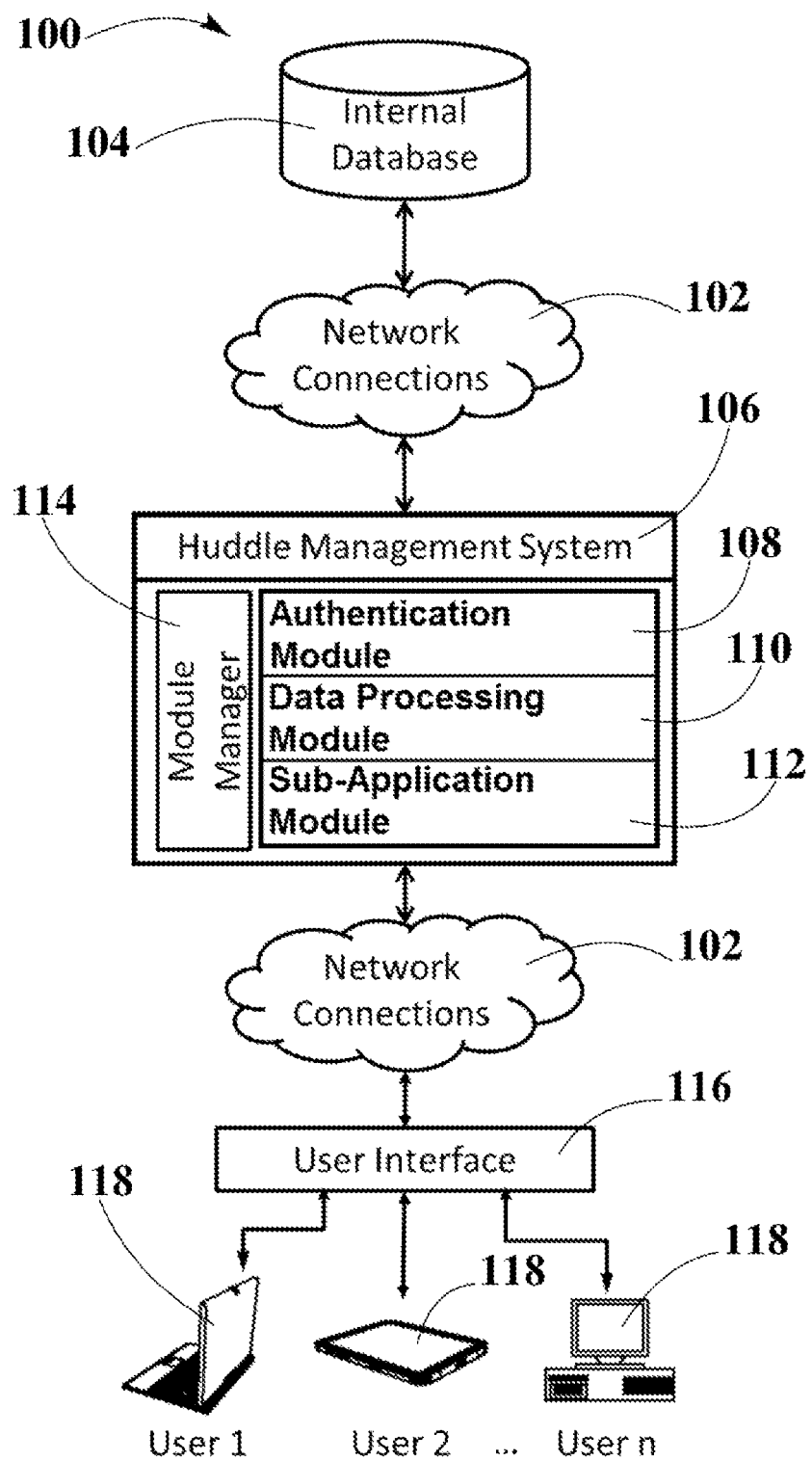
FIG. 1 is a system architecture of a remote huddle collaboration system, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used herein, the following terms have the following definitions:

"Huddle" refers to a group of two or more members of a project and organizational team, brought together on a regular basis to recognize outstanding contributions, evaluate performance, identify issues, and solve problems collaboratively.

"Huddle board" refers to a use interface generated by a huddle collaboration system which may display the content collected during a huddle in the form of one or more sub-applications.

"Active Huddle" refers to a huddle board which a leader may have started and to which one or more participants may join remotely through a huddle collaboration system.

"Huddle summary" refers to a user interface generated by a huddle collaboration system which may show one or more sub-applications in the huddle board, and each sub-application may display a summary-level view of the data it may contain.

"User's Huddle Boards" refers to a user interface generated by a huddle collaboration system which may display a list of the user's huddle boards in which he/she may be participating in, and a list of public boards which may be viewed by anyone in the company.

"Team Member" refers to a user who may participate in a remote huddle session by means of a computing device. The user may be part of the team performing tasks of a particular project.

"Leader" refers to a team member who may initiate and manage a huddle session. A leader may have an additional set of permissions that may include, for example, the ability to create huddle boards, configure or otherwise modify a huddle session, among others.

"Sub-application" refers to a software tool that may enable remote collaboration between authenticated team members in a digital huddle environment.

The present disclosure describes systems and methods for user interaction within remote huddle collaboration environments. The system may present team members participating in a virtual huddle with a set of sub-applications that may replace traditional huddle boards, and may enable participants to engage in huddles regardless of their current location. Systems and methods for providing tools for remote huddle collaboration may enable each project team member to remotely connect to huddles in a way that is consistent with a huddle that requires physical presence. Rules in place as to the sub-applications that may be available during a huddle session may reinforce the company's management system approach across multiple levels in the organization. In addition, the system may promote a clear alignment of goals and strategies while enhancing the productivity of the huddle and leveraging the human and information technology resource.

In some embodiments, a method for user interaction of a computer of a team member in a remote huddle session may include a plurality of steps performed by a processor. The steps may include authenticating the team member using the computer; presenting the authenticated team member through a home screen in which a plurality of sub-applications may be dynamically presented; running a sub-application selected by the authenticated team member displayed from the home screen as it may be laid out on a sub-applications module; and reading additional selections from the authenticated team member. Sub-applications that may be included in the huddle home screen may include recognition, morale, announcements, news feed, key protects, field metrics, dates/calendar, leader standard work, employee sentiment, and customer sentiment, among others.

In yet another embodiment, the methods for user interaction of an authenticated team member with one or more sub-applications are disclosed. A method for user interaction with a recognition sub-application may include a plurality of steps that may be executed by a processor. The steps may include retrieving recognition data from a database, displaying recognition data on a user interface of a client computing device, requesting input for new recognition data from the authenticated team member, saving the new recognition data in a database, and waiting for additional selection from the authenticated team member, among others.

In another embodiment of the present disclosure, a method for user interaction with a morale sub-application may include a plurality of steps that may be executed by a processor. The steps may include retrieving morale data from a database, displaying morale data on a user interface, requesting input for new morale data from the authenticated team member, saving the new morale data in a database, and waiting for additional selection from the authenticated team member, among others.

In another embodiment of the present disclosure, a method for user interaction with an announcement sub-application may include a plurality of steps that may be executed by a processor. The steps may include retrieving announcement data from a database, displaying announcement data on a user interface of a client computing device, requesting input for new morale data from the authenticated team member, saving the new morale data in a database, and waiting for additional selection from the authenticated team member, among others.

In another embodiment of the present disclosure, a method for user interaction with a news feed sub-application may include a plurality of steps that may be executed by a processor. The steps may include retrieving news data from a database, displaying news data on a user interface of a client computing device, and waiting for additional selection from the authenticated team member, among others.

Another embodiment of the present disclosure, a method for user interaction with a key projects sub-application may include a plurality of steps that may be executed by a processor. The steps may include retrieving key projects data from a database, displaying key projects data on a user interface of a client computing device, and waiting for additional selection from the authenticated team member, among others.

Yet another embodiment of the present disclosure is a method for user interaction with a field metrics sub-application may include a plurality of steps that may be executed by a processor. The steps may include retrieving field metrics data from a database, displaying field metrics data on a user interface of a client computing device, and waiting for additional selection from the authenticated team member, among others.

In another embodiment of the present disclosure, a method for user interaction with a date/calendar sub-application may include a plurality of steps that may be executed by a processor. The steps may include retrieving date/calendar from a database, displaying date/calendar data on the user interface of a client computing device, requesting input for new date/calendar data from the authenticated team member, saving the new date/calendar data in a database, and waiting for additional selection from the authenticated team member, among others.

In another embodiment of the present disclosure, a method for user interaction with a leader/standard work sub-application may include a plurality of steps that may be executed by a processor. The steps may include retrieving leader standard work data from a database, displaying leader standard work data on the user interface of a client computing device, requesting input for new leader standard work data from the authenticated team member, saving the new leader standard work data in a database, and waiting for additional selection from the authenticated team member, among others.

In yet another embodiment of the present disclosure, a method for user interaction with an employee sentiments sub-application may include a plurality of steps that may be executed by a processor. The steps may include retrieving employee sentiments data from a database, displaying employee sentiments data on a user interface of a client computing device, and waiting for additional selection from the authenticated team member, among others.

In another embodiment of the present disclosure, a method for user interaction with a customer sentiments sub-application may include a plurality of steps that may be executed by a processor. The steps may include retrieving customer sentiments data from a database, displaying customer sentiments data on a user interface of a client computing device, and waiting for additional selection from the authenticated team member, among others.

According to some embodiments of the present disclosure, the home screen user interface that may be displayed by the processor on a client computing device is disclosed. The home screen user interface may include a list of sub-applications that may be available to an authenticated team member. An authenticated team member may be able to select a sub-application by interacting with the home screen by means of mouse clicks, touches on screen, and voice commands, among others. An additional home screen user interface as it may be displayed by a processor on client computing devices is also disclosed. An authenticated team member may be able to select a sub-application by interacting with the additional home screen by means of mouse clicks, touches on screen, and voice commands, among others.

FIG. 1 is an illustration of the system architecture 100 of a remote huddle collaboration system, according to an embodiment. The disclosed system architecture 100 may include different components which may dynamically interact with each other through network connections 102. Network connections 102 may refer to any connection between computers, such as for example intranets, local area networks (LAN), virtual private networks (VPN), wireless area networks (WAN), and the internet, among others.

System architecture 100 may include one or more internal databases 104, a huddle management system 106, a plurality of servers (not shown in FIG. 1), and a plurality of client computing devices 118, among other components. Internal database 104 may store data generated by one or more software modules, operating within huddle management system 106, data and files uploaded by participants of the huddle session, as well as the credentials of each team member of the company for accessing and modifying huddle boards, among others. Internal database 104 may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data. Internal database 104 may include huddle collaboration files, which are records that store information about a huddle board, sub-applications associated with the huddle board, whether the huddle board is an active huddle board, which users are associated with the huddle board, any positions or roles of the users associated with the huddle board, and information about the look and feel of how to present the huddle board on a display.

Huddle management system 106 may be operatively coupled to internal database 104 through network connections 102, and may include one or more authentication modules 108, one or more data processing modules 110, one or more sub-applications module 112, one or more module managers 114, and any other suitable software module required for the proper operation of huddle management system 106. Each module within huddle management system 106 may be executed by a central processing units that may run computer executable program instructions or related algorithms. Each central processing unit may be component of a computing device such as a server, a single computer, or multiple computers in a distributed configuration.

Sub-applications module 112 may display a suitable user interface 116 on client computing device 118, so a user, such as a team leader and/or a team participant, may interact with huddle management system 106. Client computing device 118 may be any computer type device such as smartphones, desktop computers, laptop computers, tablets, PDAs, and/or another type of processor-controlled device that may receive, process, and/or transmit digital data. In some embodiments, huddle management system 106 may display additional user interface 116 on client computing devices 118 that may correspond to tasks not specific to sub-applications described herein.

A user may interact with user interface 116 via an input device, such as a touch screen, a mouse, a keyboard, and a keypad, among others. Authentication module 108 may request credentials from users interacting with the user interface 116 and may validate them in order to assign authorization to access, activate, edit, and/or manage one or more huddle boards and/or sub-applications in the huddle board. Data processing module 110 may process information collected during huddle sessions, and may store this information in internal database 104 when needed. Data processing module 110 may also be configured to automatically retrieve information requested by one or more sub-applications module 112, where this information may be obtained from internal database 104 and/or the suitable interaction of one or more modules within huddle management system 106. Module manager 114 may interact with one or more modules operating within huddle management system 106, control the operation of sub-applications modules 112, and process requests from one or more client computing devices 118 interacting huddle management system 106, among other activities.

Internal database 104 may store any suitable information generated from the operation of one or more modules within huddle management system 106 and may make it available for further analysis performed by one or more modules within huddle management system 106 and/or the leader of one or more team members of a huddle.

Figure 2:
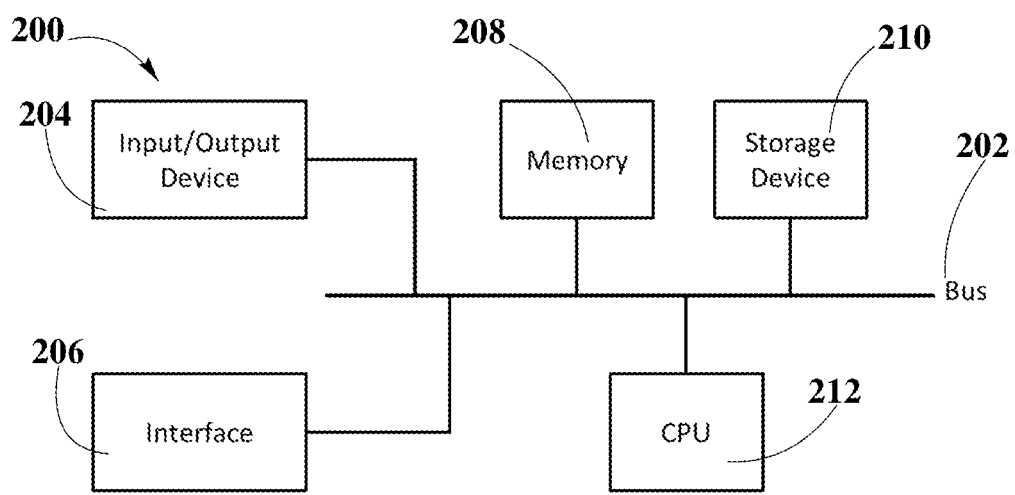
FIG. 2 is an exemplary computing device in which one or more embodiments of the present disclosure may operate, according to an embodiment.

FIG. 2 is a block diagram of example components of a computing device 200, which may correspond to a server, a client computing device 118, smartphones, desktop computers, laptop computers, tablets, PDAs, and/or another type of processor-controlled device that may receive, process, and/or transmit digital data, among others, according to an embodiment.

According to some aspects of this embodiment, computing device 200 may include a bus 202, an input/output device 204, a communication interface 206, a memory 208, a storage device 210 and a central processing unit 212. In another embodiment, computing device 200 may include additional, fewer, different, or differently arranged components than those illustrated in FIG. 2.

Bus 202 may include a path that permits components within computing device 200 to communicate with each other. Input/output device 204 may include peripherals and/or other mechanism that may enable a user to input information to the computing device 200, including, for example, a keyboard, a mouse, a button, a touch screen, voice recognition, and biometric mechanisms, among others. Input/output device 204 may also include a mechanism that outputs information to the user of computing device 200 such as, for example, a display, a light emitting diode (LED), a printer, and a speaker, among others. Communication interface 206 may include mechanisms that may enable computing device 200 to communicate with other computing devices and/or systems through network connections. Network connections may refer to any suitable connections between computers such as, for example, intranets, local area networks (LAN), virtual private networks (VPN), wireless area networks (WAN) and the internet among others. Memory 208 may include a random access memory (RAM) or another type of dynamic storage device that may store information and instructions for execution by central processing unit 212. Storage device 210 may include a magnetic and/or optical recording medium such as read-only memory, flash memory, ferro-electric RAM (F-RAM) hard disks, solid-state drives, floppy disks, and optical discs, among others. Central processing unit 212 may include a microprocessor, an application specific integrated circuit (ASIC), and field programmable object array (FPOA), among others, which may interpret and execute instructions.

According to some aspects of this embodiment, at least one computing device 200, such as a server, and a client computing device 118, among others, may perform certain operations to conduct huddles remotely and that may be required for the proper operation of a huddle management system. Client computing devices 118, and a server, among others may perform these operations in response to central processing unit 212 executing software instructions contained in a computer-readable medium, such as memory 208.

The software instructions may be read into memory 208 from another computer-readable medium, such as storage device 210, or from another computing device via communication interface 206. The software instructions contained in memory 208 may cause central processing unit 212 to perform processes that will be described later. Alternatively, hardwired circuitry may be used in place of or in combination with software instructions to implement processes described herein. Thus, implementations described herein are not limited to any specific combination of hardware circuitry and software.

Exemplary Processes for Remote Huddle Collaboration Environment

A plurality of process that may be part of the overall process executed by a processor during a remote huddle session is disclosed. In one embodiment, the process may be performed by one or more components of servers and client computing devices such as huddle management computing device 200, by executing instructions that may be laid out in a sub-applications module that may be part of the huddle management system. While the blocks in the disclosed process are shown in a particular order, the actual order may differ. In some embodiments, some steps may be performed in parallel.

Figure 3:
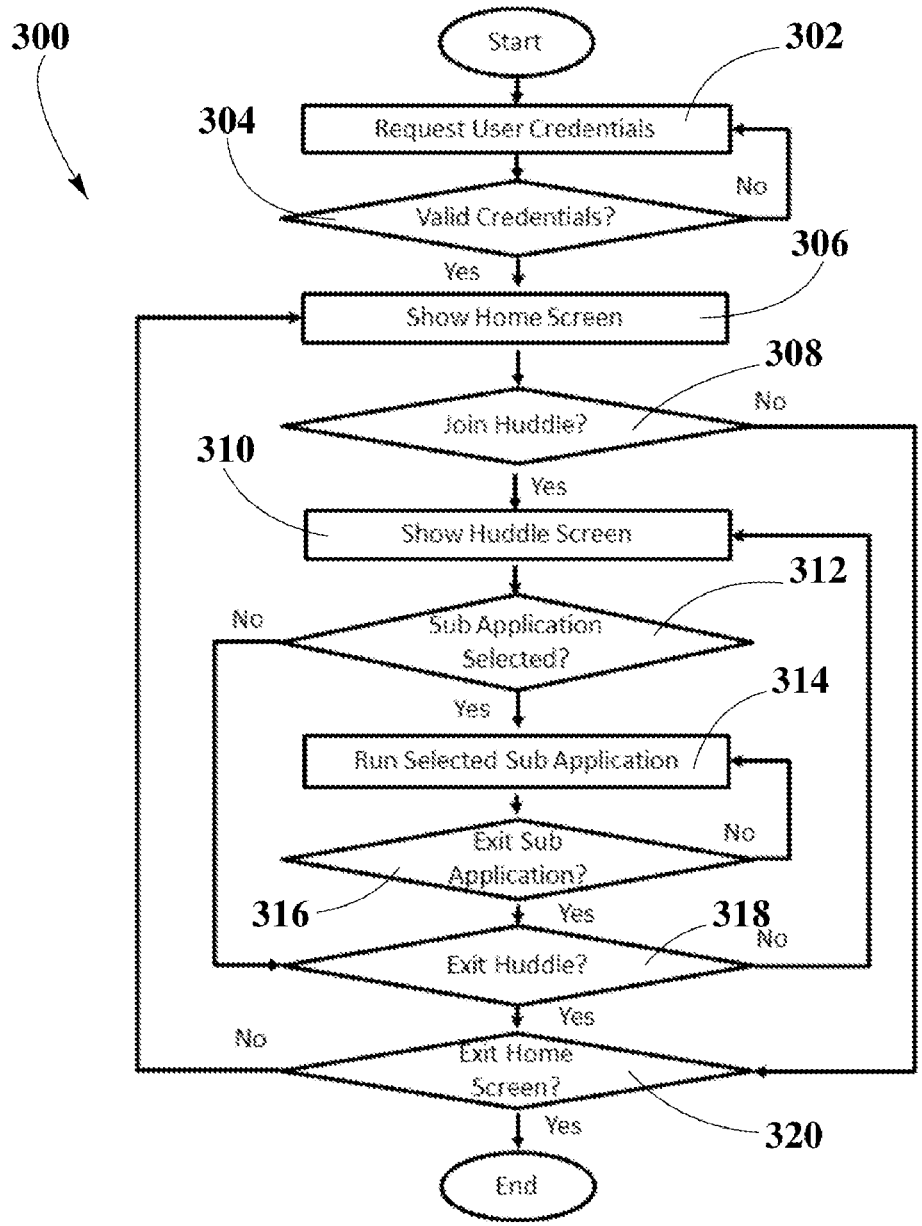
FIG. 3 is a flowchart of a process that may describe the general user interaction with sub-applications in a remote huddle collaboration session, according to an embodiment.

FIG. 3 is a flowchart of a general process 300 that may describe a general user interaction with sub-applications in a remote huddle collaboration session, according to another embodiment.

General process 300 may include, at step 302, a processor such as central processing unit 212, displaying a user interface on at least a client computing device to request authentication credentials from a team member who may participate in a remote huddle collaborating environment. The processor may validate, at step 304, the credentials provided by the team member through the user interface, by executing instructions that may be laid out in an authentication module that may be part of the huddle management system. Processor may continue to display the huddle management system home screen on the user interface, at step 306, only after the team member provides appropriate credentials, at step 304.

At step 306, the processor may display a list of huddle sessions that may be available for the team member to participate in. The list of available huddle sessions may include public huddles (available for every one) as well as private huddle session that may only be available to the authenticated team member. At step 308, the processor may wait for an authenticated team member to select a huddle to join. If the authenticated team member chooses to join a huddle session, the processor may join the team member to the selected huddle session and show a huddle screen that may include a summary-level view and a list of sub-applications where the team member may additionally choose one or more of those sub-applications, at step 310.

In some embodiments, the list of sub applications may be limited by the size of the screen of the client computing device and the content of the sub applications. In some embodiments, the list us sub applications available at the summary-level view may vary, and may be based on usage statistics. For example, in some embodiments, if the huddle management system determines that the announcements sub application is the most selected sub application across all huddle sessions, it may show the announcement sub applications first on the summary view at expenses of not showing the least viewed sub application on the same summary view. In other embodiments, the list of sub applications shown in the huddle summary may follow a different prioritization.

A the summary level view user interface, the processor may display a greeting that is customized to the authenticated team member, including "good morning", "good afternoon", "happy birthday", and "happy holidays" among others that may depend on the date of the calendar, and the hour of the day. Additionally, for the summary-level view, the processor may pull information from the sub applications' details. For example in the summary level, may represent the percentage of team members among all team members population that have annotated themselves as happy in the morale sub application, and the percentage of the same population that have annotated themselves otherwise, among others.

The processor may wait, at step 312, for the team member to select a sub application from the list displayed, at step 310. After the team member selects a sub-application, the processor may execute the selected sub-application, at step 314, according to computer instruction that may be laid out in a sub-applications module which may be part the huddle management system. Additional options, menus, and sub-applications may be displayed on the user interface of the client computing device by the processor, including an option for exiting the huddle session.

The processor may wait for additional interaction of the team member with the user interface, at step 316, if the team member chooses to exit the sub-application, the processor may end the currently running sub-application and may wait for additional interaction from the team member, at step 318. If the team member chooses not to exit the ongoing huddle session, the processor may wait for the team member to select a sub-application to run, back at step 312. If the team member chooses to exit the ongoing huddle session, the processor may wait for additional interaction from the member, at step 320. If the team member chooses not to sign off the remote huddle collaboration environment, the processor may show the list of sub-applications available for the team member, back at step 310.

If the team member chooses to exit the remote huddle collaboration environment, at step 312, general process 300 may end, and the processor may execute additional steps (not shown in FIG. 3) that may include saving current status of the huddle management system, logging off the team member, and handling over control of the computing device to another module of the huddle management system or other process.

Additionally, whenever the team leader is conducting a huddle session, team members may be sharing the same screen of the team leader. Consequently, once team members join the huddle session, team members be able to see the screen that the team leader handling during the huddle session. For example, if the team leader is on the key project sub-application screen, team members may be sharing the key project sub-application screen of team leader; if the leader is on the main screen, team member may be also sharing the main screen of team leader. Furthermore, undecided whether participants may not be able to edit content during a live huddle. Most of changes made during a huddle session may only be available to the leader.

Exceptionally, team members with additional permissions may be able to type down notes during the session; these notes may be stored made available to team members or other users that may want to replay the huddle session. Notes taken during the huddle session may be shown as overlays on the user interface displayed by the processor for an ongoing huddle session, and may also be available to team members or other users of the huddle management system.

Sub-applications executed by the processor at step 310, may include recognition, morale, announcements, news feed, key protects, field metrics, dates/calendar, leader standard work, employee sentiment, and customer sentiment, among others. For each sub-application, the processor may display a unique user interface that may enable the team member to interact with the remote huddle session. Additionally, team members may be allowed to post data to a plurality of sub applications by sending communications through emails, a short message service text (SMS), an multimedia message (MMS), among other types of communications to the huddle session. Some of the sub applications that may be updated by these means include announcements, morale, recognition, news feed, and employee sentiment, among others. The team members can send a data message over an electronic network to a predetermined location (e.g., email address, text message number, IP address) or recipient computing device (e.g., leader computer, team member computer, huddle management server, database), and the data message can be transformed and/or processed to allow the huddle board to be updated accordingly. The data message may comprise information to be displayed on the huddle board, information to be stored in a database that forms the basis of the information displayed on the huddle board, or information to request a change in particular data or status.

When a user computer is displaying a huddle board page having a sub-application, the user can send the message including the information to be updated for that particular huddle board page. When the message is received by the huddle management server, the huddle management server can determine the user by the sender address. The huddle management server queries the active huddle boards (or all huddle board files) to determine which huddle board is associated with the user. When the huddle management server determines that the user is associated with an active huddle board, the huddle management server can update the active huddle board with the information inputted from the user computer.

In an alternative embodiment, the huddle management server can determine which huddle boards are associated with the user based upon the sender address. The huddle management server can update a database with the inputted data. Any huddle board pages requesting that data will dynamically update to present the updated data.

Each sub-application may include a process for interacting with the team member as it may be shown below.

Figure 4:
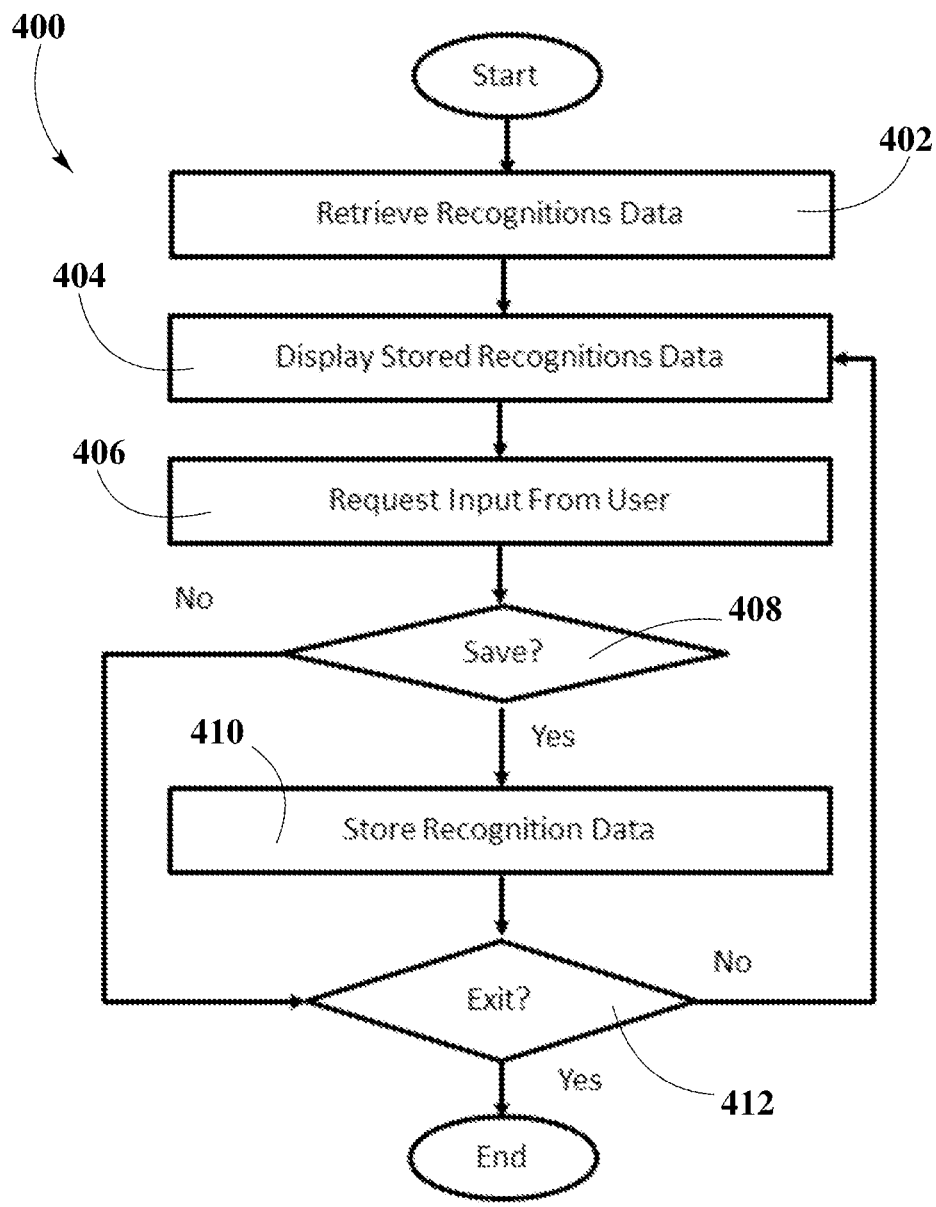
FIG. 4 is a flowchart of a process that may describe the user interaction with a recognition sub-application in a remote huddle collaboration session, according to an embodiment.

FIG. 4 is a flowchart of a process 400 that may describe the user interaction with a recognition sub-application in a remote huddle collaboration session, according to another embodiment. The recognition sub-application may be used as a place for team members who may participate in a huddle session, to recognize anyone that may have done exceptional work.

Process 400 may include, at step 402, a processor such as central processing unit 212 requesting recognitions data from an internal database that may be part of the system architecture of a huddle management system. At step 404, the processor may display on the user interface of a client computing device, the list of recognitions that may be relevant to the authenticated team member.

Processor may continue to request from the team member, through the user interface, input for a new recognition data, at step 406. The team member may interact with the user interface and choose to save the new recognition data. The processor may read, at step 408, the selection made by the team member from the user interface and store the new recognition data, at step 410. Whether the team member chooses to save the recognition data or not, the processor may wait for additional selection at step 412, which may include exiting the sub-application. If the team member chooses not to exit the sub-application, the processor may then execute go back from step 402 and forward.

Recognition data entered by the team member at step 406 may be relate to a user whom the authenticated team member acknowledges for outstanding work or performance. Recognition data may be sent to the acknowledged user by either email, SMS, MMS or comparable communication media.

If the team member chooses to exit the recognition sub-application session, at step 412, process 400 may end and the processor may execute additional steps (not shown in FIG. 4) that may include saving current status of the recognition sub-application, and handling over control of the computing device to another module of the huddle management system or other process.

Figure 5:
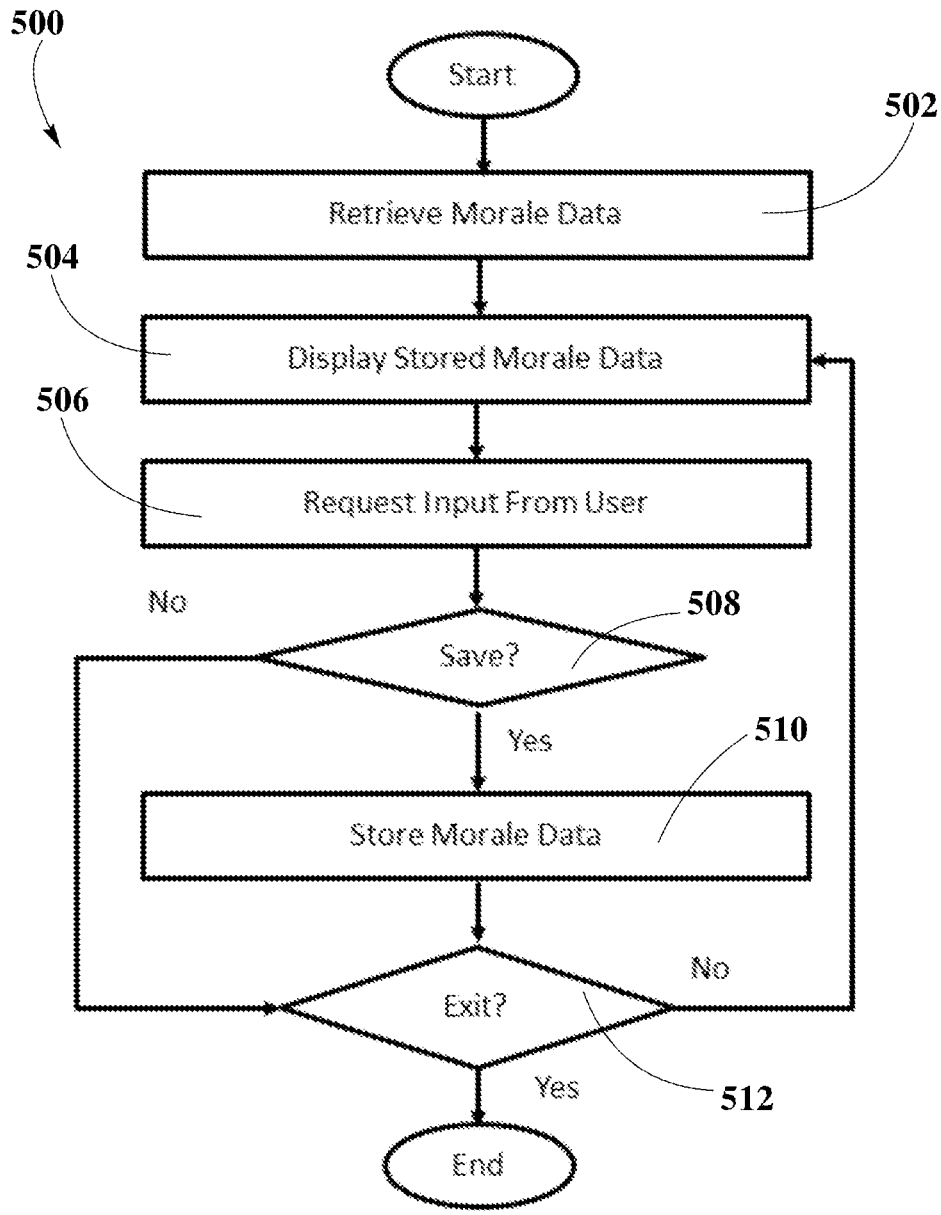
FIG. 5 is a flowchart of a process that may describe the user interaction with a morale sub-application in a remote huddle collaboration session, according to an embodiment.

FIG. 5 is a flowchart of a process 500 that may describe the user interaction with a morale sub-application in a remote huddle collaboration session, according to another embodiment. The morale sub-application may be used to indicate how each team member is feeling by using an image selected from a library of images and an additional statement. Morale may be updated by each team member before every huddle session.

Process 500 may include, at step 502, a processor such as central processing unit 212 requesting morale data from an internal database that may be part of the system architecture of a huddle management system. At step 504, the processor may display on the user interface of a client computing device, the list of morale data that may be relevant to the authenticated team member.

Processor may continue to request from the team member, through the user interface, input for a new recognition, at step 506. The team member may interact with the user interface and choose to save the new morale data. The processor may read, at step 508, the selection made by the team member selection from the user interface and store the new morale data, at step 510. Whether the team member chooses to save the recognition data or not, the processor may wait for additional selection at step 512, which may include exiting the sub-application. If the team member chooses not to exit the sub-application, the processor may then execute go back from step 502 and forward.

If the team member chooses to exit the morale sub-application session, at step 512, process 500 may end and the processor may execute additional steps (not shown in FIG. 5) that may include saving current status of the recognition sub-application, and handling over control of the computing device to another module of the huddle management system or other process.

Figure 6:
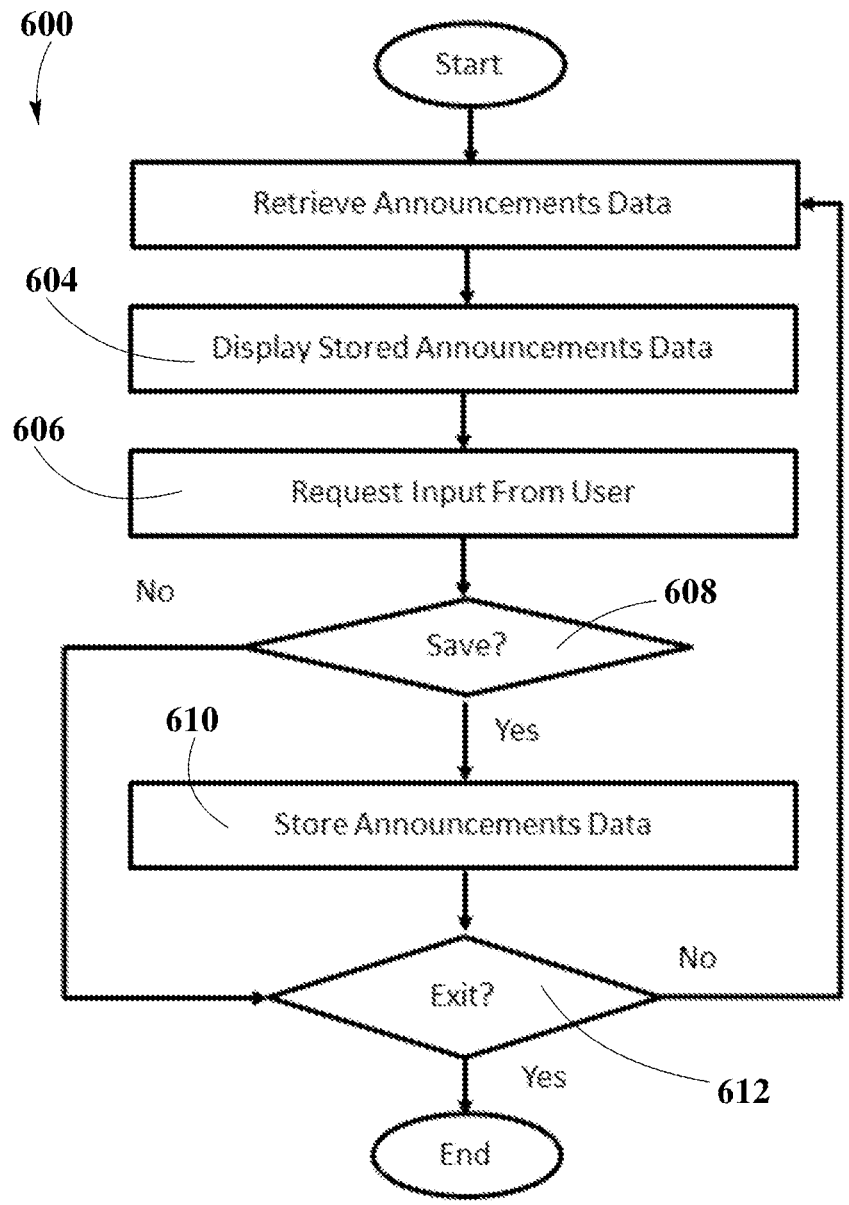
FIG. 6 is a flowchart of a process that may describe the user interaction with an announcement sub-application in a remote huddle collaboration session, according to an embodiment.

FIG. 6 is a flowchart of a process 600 that may describe the user interaction with an announcement sub-application in a remote huddle collaboration session, according to another embodiment. The announcements sub-application may be used by team members to share important events/news with the rest of the team and participants of a huddle session. Additionally, announcement sub-application may include internal and external company news. Announcement sub-application session may also include features, such as add links, a reminder (to indicate the time of the huddle meeting), and an identifier to indicate whether certain announcement was made by a team member, a huddle announcement, or a broadcast to only certain parts of the company (e.g., an announcement on all IT huddle boards).

Process 600 may include, at step 602, a processor such as central processing unit 212 requesting announcement data from an internal database that may be part of the system architecture of a huddle management system. At step 604, the processor may display on the user interface of a client computing device, the list of announcement data that may be relevant to the authenticated team member.

Processor may request from the team member, through the user interface, input for a new announcement, at step 606. The team member may interact with the user interface and choose to save the new announcement data. The processor may read, at step 608, the selection made by the team member selection from the user interface and store the new announcement data, at step 610. Whether the team member chooses to save the announcement data or not, the processor may wait for additional selection, at step 612, which may include exiting the sub-application. If the team member chooses not to exit the sub-application, the processor may then execute go back from step 602 and forward.

If the team member chooses to exit the announcement sub-application session, at step 612, process 600 may end and the processor may execute additional steps (not shown in FIG. 6) that may include saving current status of the announcement sub-application, and handling over control of the computing device to another module of the huddle management system or other process.

Announcements made may additionally be created from tools others than the ones available at the huddle management system. Conform to configuration, the huddle management system may made announcements available to specific huddle sessions, or populate it to other huddle boards.

Figure 7:
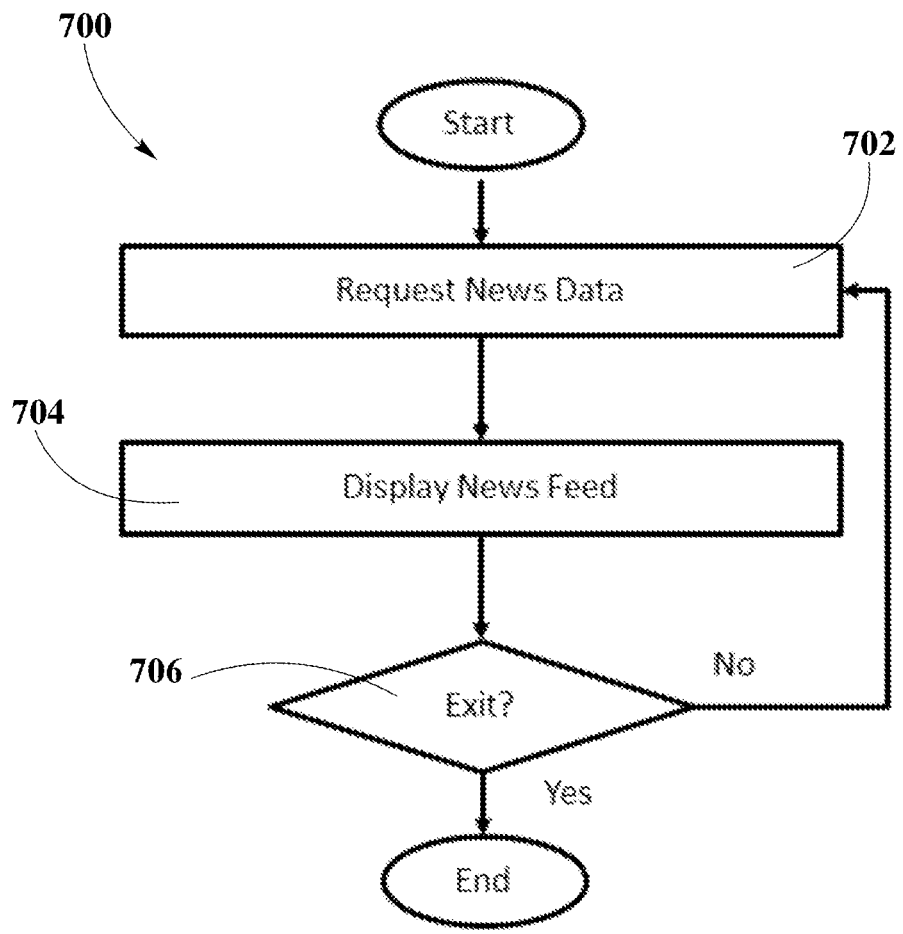
FIG. 7 is a flowchart of a process that may describe the user interaction with a news feed sub-application in a remote huddle collaboration session, according to an embodiment.

FIG. 7 is a flowchart of a process 700 that may describe the user interaction with the ability to push company news into a announcements sub-application, replacing the need for the newsfeed sub-application. The news feed sub-application may provide team members with relevant news and alerts as it may be disclosed by corporate management. In some embodiments, news feed content may be tailored to specific team members. In other embodiments, news feed content may be broadcasted evenly among all team members.

Process 700 may include, at step 702, a processor such as central processing unit 212 requesting news data from an internal database that may be part of the system architecture of a huddle management system. At step 704, the processor may display on the user interface of a client computing device, the list of news data that may be relevant to the authenticated team member.

Processor may wait, at step 706, for additional selection from the team member which may include exiting the sub-application. If the team member chooses not to exit the sub-application, the processor may then execute go back from step 702 and forward.

If the team member chooses to exit the news feed sub-application session, at step 706, process 700 may end and the processor may execute additional steps (not shown in FIG. 7) that may include saving current status of the announcement sub-application, and handling over control of the computing device to another module of the huddle management system or other process.

Figure 8:
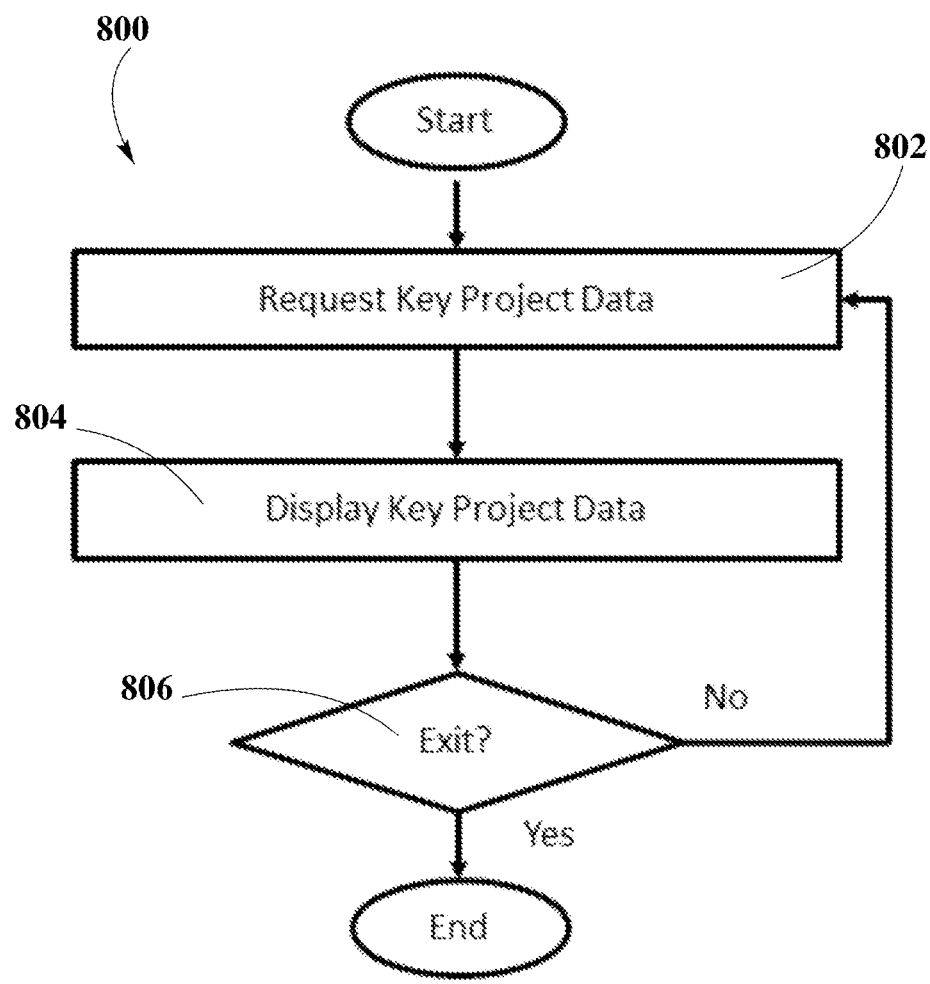
FIG. 8 is a flowchart of a process that may describe the user interaction with a key project sub-application in a remote huddle collaboration session, according to an embodiment.

FIG. 8 is a flowchart of a process 800 that may describe the user interaction with a key project data sub-application in a remote huddle collaboration session, according to another embodiment. The key project data sub-application may be used by team members to store and track important information about each project where a relevant team member may be part of.

Process 800 may include, at step 802, a processor such as a central processing unit requesting news data from an internal database that may be part of the system architecture of a huddle management system. At step 804, the processor may display on the user interface of a client computing device, the list of key project data that may be relevant to the authenticated team member.

Processor may wait, at step 806, for additional selection from the team member which may include exiting the sub-application. If the team member chooses not to exit the sub-application, the processor may then execute go back from step 802 and forward.

If the team member chooses to exit the key project data sub-application session, at step 806, process 800 may end and the processor may execute additional steps (not shown in FIG. 8) that may include saving current status of the key project data, and handling over control of the computing device to another module of the huddle management system or other process.

Moreover, key project data may provide functions that may enable team members to additional functions, including editing rows and columns, and inserting next projects which may be used for future huddle sessions, among others.

Figure 9:
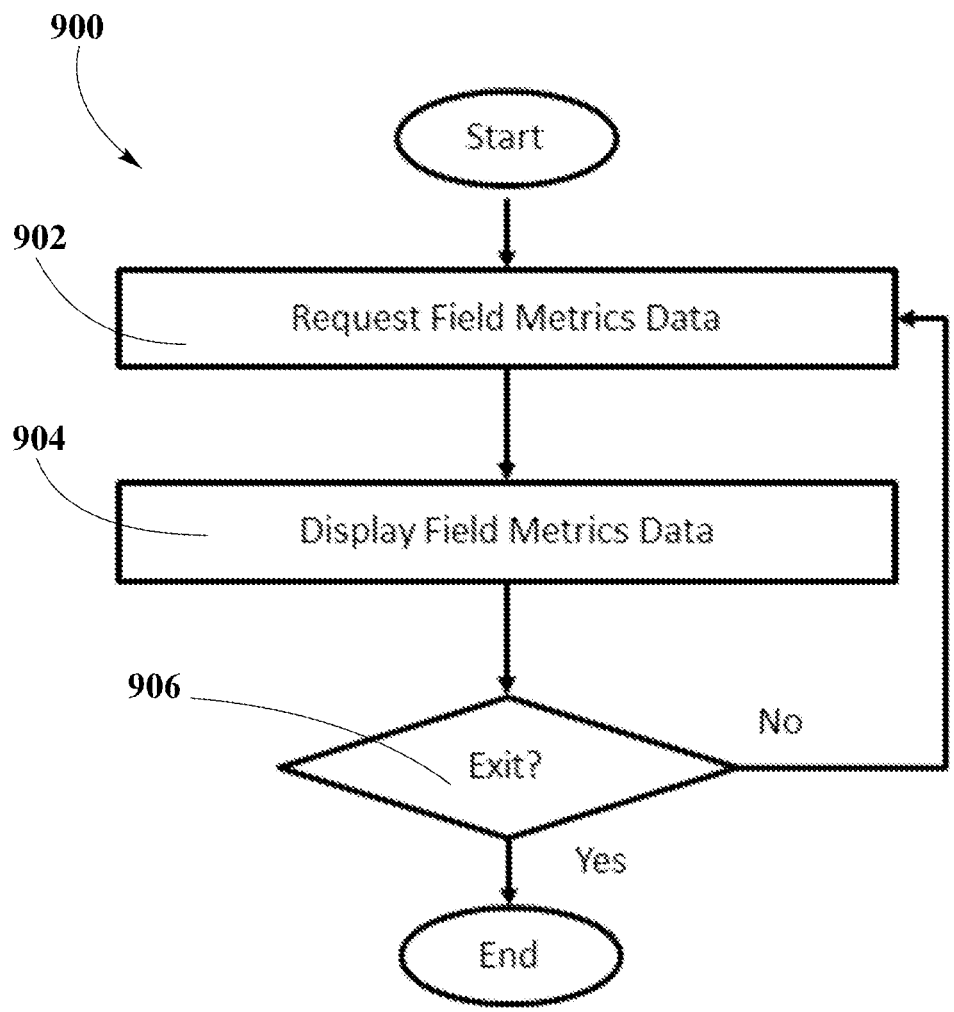
FIG. 9 is a flowchart of a process that may describe the user interaction with a field metrics data sub-application in a remote huddle collaboration session, according to an embodiment.

FIG. 9 is a flowchart of a process 900 that may describe the user interaction with a field metrics data' sub-application in a remote huddle collaboration session, according to another embodiment. The field metrics sub-application may be used as a place to share business data from a plurality of business areas that may or may not be relevant to team members participating in the huddle session.

Process 900 may include, at step 902, a processor such as central processing unit 212 requesting field metrics data from an internal database that may be part of the system architecture of a huddle management system. At step 904, the processor may display on the user interface of a client computing device, the list of field metrics data that may be relevant to the authenticated team member.

Processor may wait, at step 906, for additional selection from the team member which may include exiting the sub-application. If the team member chooses not to exit the sub-application, the processor may then execute go back from step 902 and forward.

If the team member chooses to exit the key project data sub-application session, at step 906, process 900 may end and the processor may execute additional steps (not shown in FIG. 9) that may include saving current status of the field metrics data sub-application, and handling over control of the computing device to another module of the huddle management system or other process.

Figure 10:
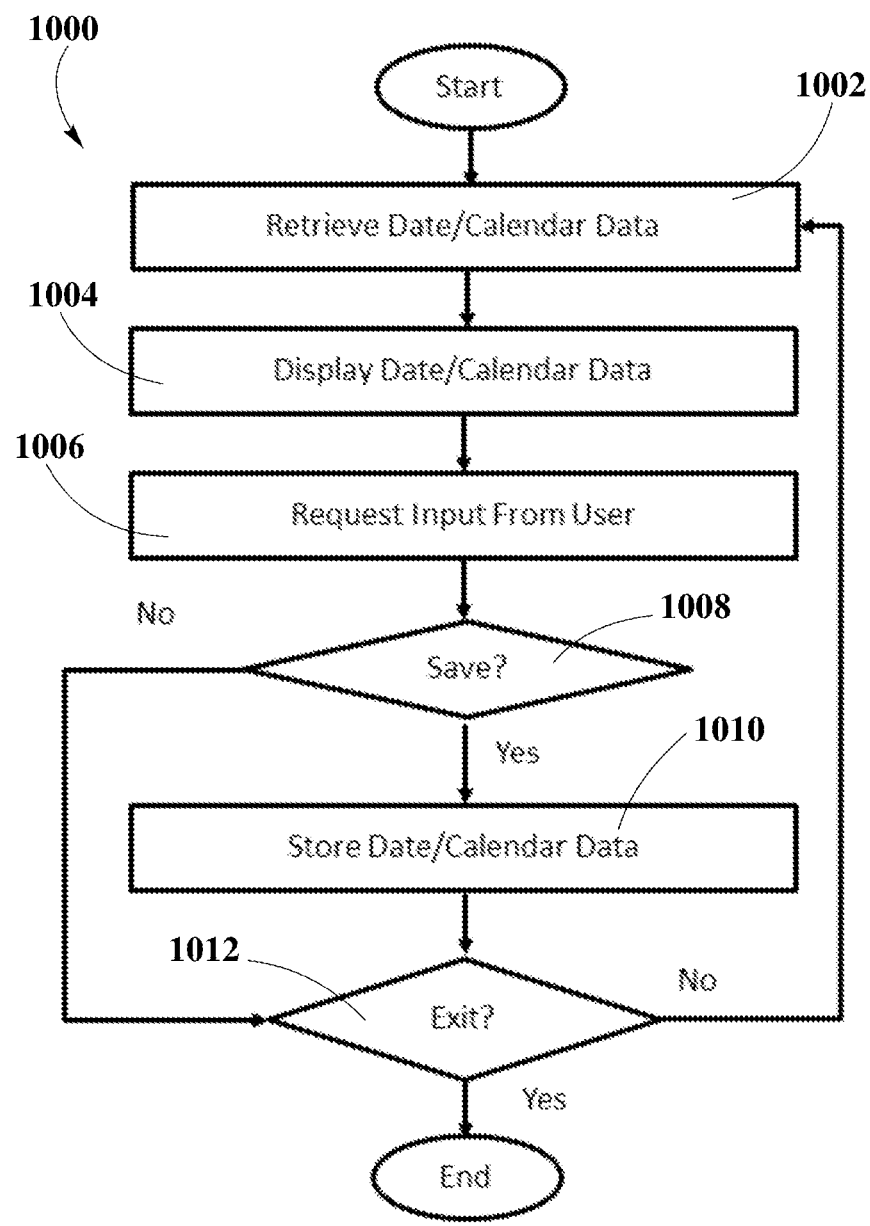
FIG. 10 is a flowchart of a process that may describe the user interaction with a date/calendar sub-application in a remote huddle collaboration session, according to an embodiment.

FIG. 10 is a flowchart of a process 1000 that may describe the user interaction with a date/calendar sub-application in a remote huddle collaboration session, according to another embodiment. The date/calendar sub-application may be used by team members to share important dates with one another such as, for example, out of office days, holidays, and team meeting dates, among others.

Process 1000 may include, at step 1002, a processor such as central processing unit 212 requesting date/calendar data from an internal database that may be part of the system architecture of a huddle management system. At step 1004, the processor may display on the user interface of a client computing device, the list of date/calendar data that may be relevant to the authenticated team member.

Processor may continue to request from the team member, through the user interface, input for a new date/calendar data, at step 1006. The team member may interact with the user interface and choose to save the new date/calendar data. The processor may read, at step 1008, the selection made by the team member selection from the user interface and store the new date/calendar data, at step 1010. Whether the team member chooses to save the date/calendar data or not, the processor may wait for additional selection at step 1012, which may include exiting the sub-application. If the team member chooses not to exit the sub-application, the processor may then execute go back from step 1002 and forward.

If the team member chooses to exit the date/calendar sub-application session, at step 1012, process 1000 may end and the processor may execute additional steps (not shown in FIG. 10) that may include saving current status of the date/calendar sub-application, and handling over control of the computing device to another module of the huddle management system or other process.

Figure 11:
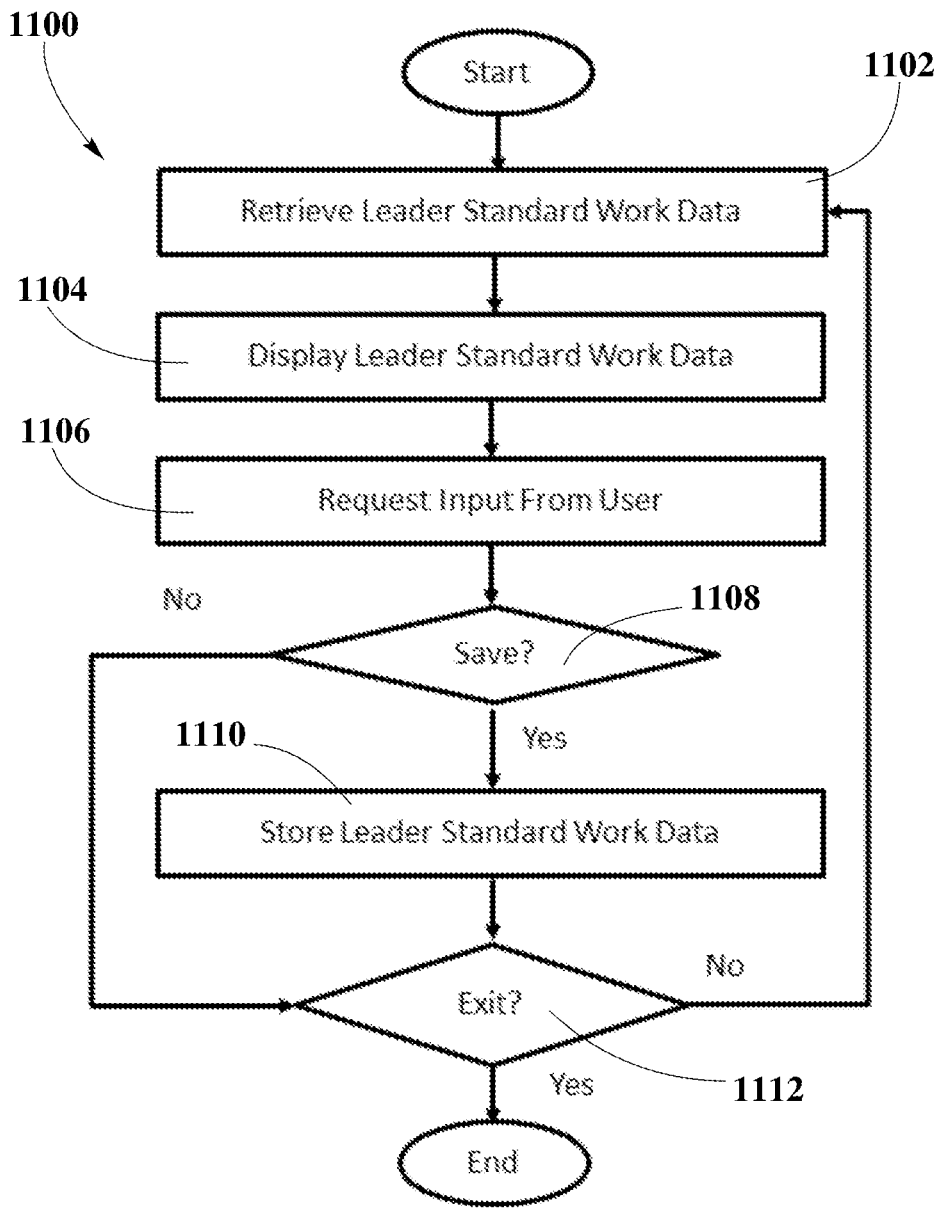
FIG. 11 is a flowchart of a process that may describe the user interaction with a leader standard work sub-application in a remote huddle collaboration session, according to an embodiment.

FIG. 11 is a flowchart of a process 1100 that may describe the user interaction with a leader standard work sub-application in a remote huddle collaboration session, according to another embodiment. The leader standard work sub-application may be used by team members to record progress on standard work efforts.

Process 1100 may include, at step 1102, a processor such as central processing unit 212 requesting leader standard work data from an internal database that may be part of the system architecture of a huddle management system. At step 1104, the processor may display on the user interface of a client computing device, the list of leader standard work data that may be relevant to the authenticated team member.

Processor may continue to request from the team member, through the user interface, input for a new leader standard work entry, at step 1106. The team member may interact with the user interface and choose to save the new leader standard work entry. The processor may read, at step 1108, the selection made by the team member selection from the user interface and store the new leader standard work data, at step 1110. Whether the team member chooses to save the leader standard work data or not, the processor may wait for additional selection at step 1112, which may include exiting the sub-application. If the team member chooses not to exit the sub-application, the processor may then execute back from step 1102 and forward.

If the team member chooses to exit the leader standard work sub-application session, at step 1112, process 1100 may end and the processor may execute additional steps (not shown in FIG. 11) that may include saving current status of the leader standard work sub-application, and handling over control of the computing device to another module of the huddle management system or other process.

Figure 12:
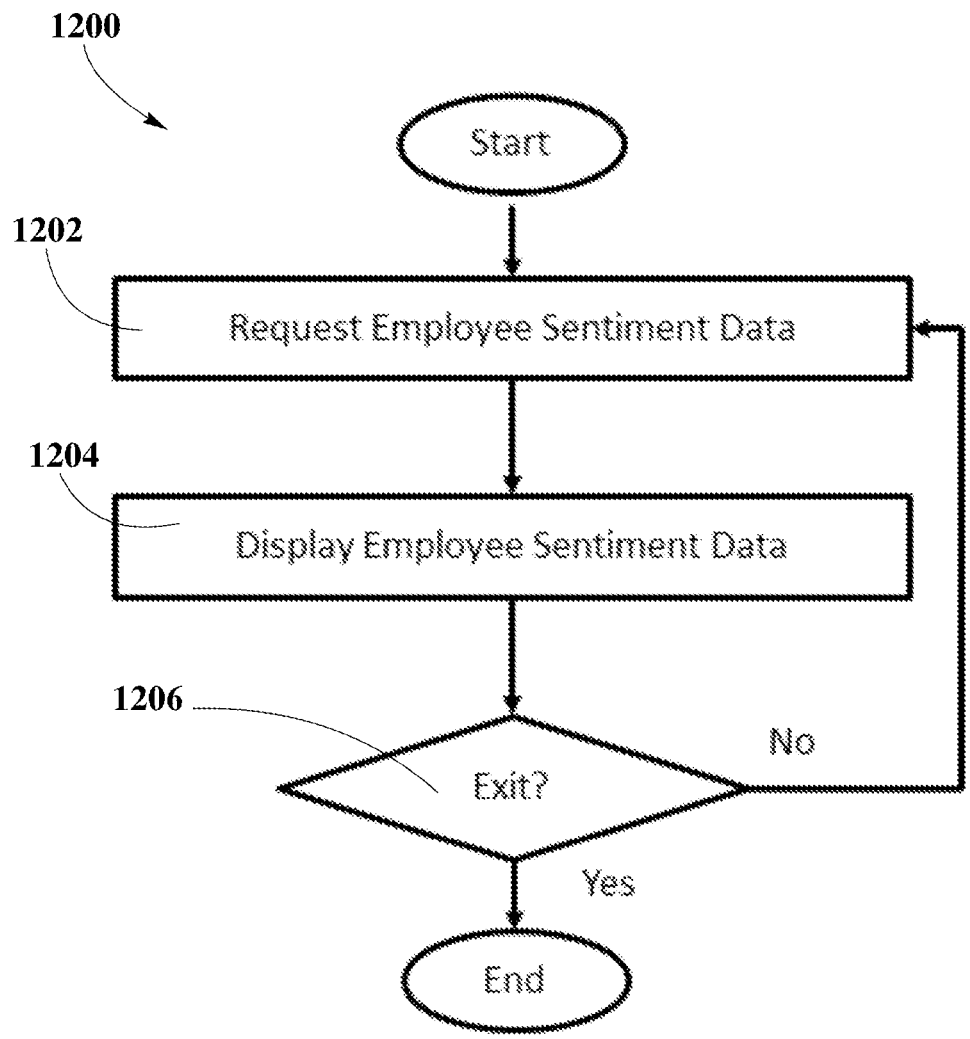
FIG. 12 is a flowchart of a process that may describe the user interaction with an employee sentiment sub-application in a remote huddle collaboration session, according to an embodiment.

FIG. 12 is a flowchart of a process 1200 that may describe the user interaction with an employee sentiment sub-application in a remote huddle collaboration session, according to another embodiment. The employee sentiment sub-application may be used by team members to view the results of employee surveys that may be carried out on or before huddle sessions.

Process 1200 may include, at step 1202, a processor such as central processing unit 212 requesting employee sentiment data from an internal database that may be part of the system architecture of a huddle management system. At step 1204, the processor may display on the user interface of a client computing device, the list of employee sentiment data that may be relevant to the authenticated team member.

Processor may wait, at step 1206, for additional selection from the team member which may include exiting the sub-application. If the team member chooses not to exit the sub-application, the processor may then execute go back from step 1202 and forward.

If the team member chooses to exit the employee sentiment sub-application session, at step 1206, process 1200 may end and the processor may execute additional steps (not shown in FIG. 12) that may include saving current status of the employee sentiment sub-application, and handling over control of the computing device to another module of the huddle management system or other process.

Figure 13:
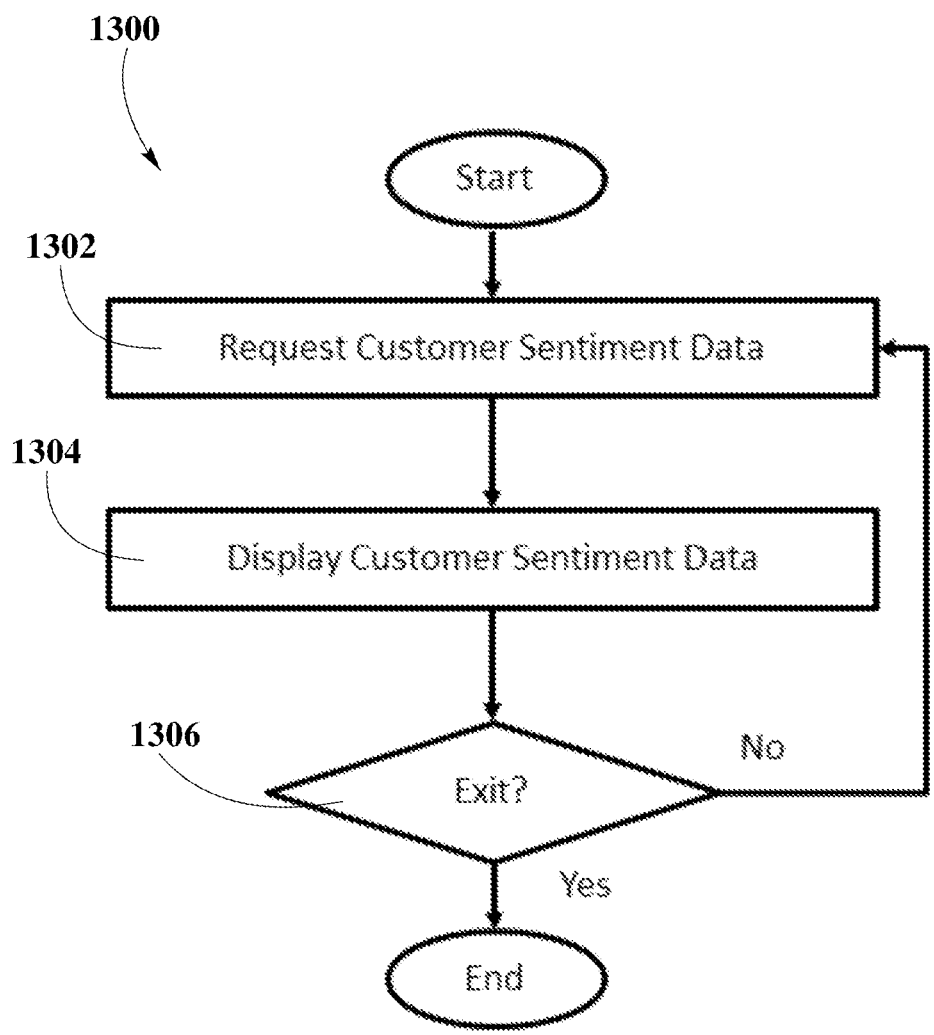
FIG. 13 is a flowchart of a process that may describe the user interaction with a customer sentiment sub-application in a remote huddle collaboration session, according to an embodiment.

FIG. 13 is a flowchart of a process 1300 that may describe the user interaction with a customer sentiment sub-application in a remote huddle collaboration session, according to another embodiment. The customer sentiment sub-application may be used by team members to view the results of customer surveys that may be carried out on or before huddle sessions.

Process 1300 may include, at step 1302, a processor such as central processing unit 212 requesting customer sentiment data from an internal database that may be part of the system architecture of a huddle management system. At step 1304, the processor may display on the user interface of a client computing device, the list of customer sentiment data that may be relevant to the authenticated team member.

Processor may wait, at step 1306, for additional selection from the team member which may include exiting the sub-application. If the team member chooses not to exit the sub-application, the processor may then execute back from step 1302 and forward.

If the team member chooses to exit the customer sentiment data sub-application session, at step 1306, process 1300 may end and the processor may execute additional steps (not shown in FIG. 13) that may include saving current status of the customer sentiment sub-application, and handling over control of the computing device to another module of the huddle management system or other process.

The list of sub-application and processes described herein are not meant to be the only ones a team member may have available on a remote huddle session. Other processes, as they may correspond to other sub-applications may additionally be operated by the processor. Other sub-applications may include chat and video capabilities that may enable team members to interact with one another while participating on the remote huddle session, additional sub-applications may use similar processes to those previously described. In other embodiments of the present disclosure, additional sub-applications may use different processes than the ones previously described.

Figure 14:
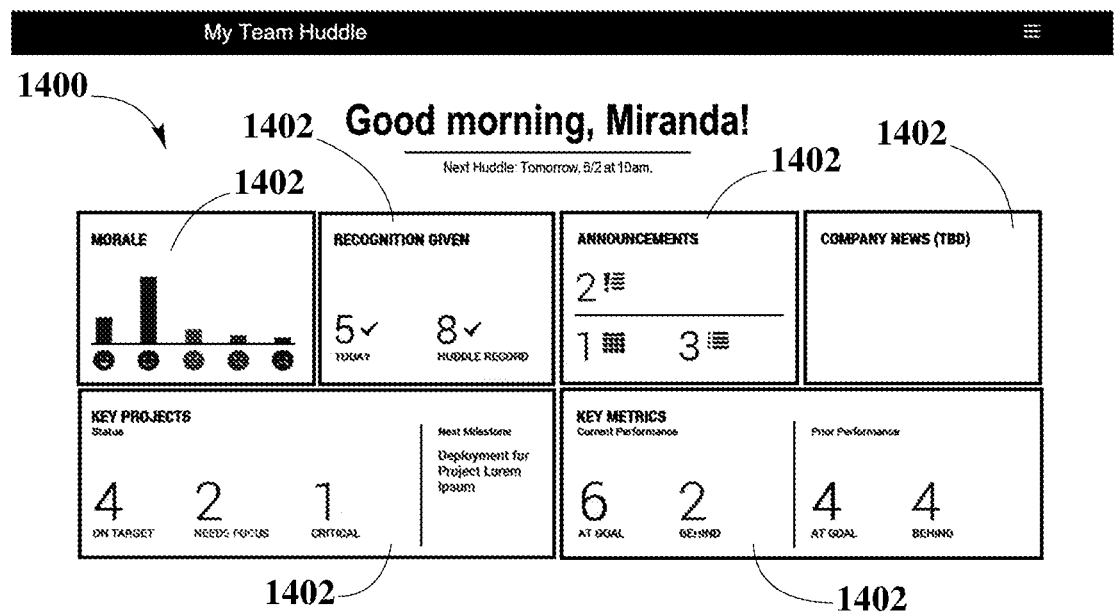
FIG. 14 is an illustration of an exemplary user interface of a huddle summary, according to another embodiment.

FIG. 14 is an illustration of an exemplary embodiment of user interfaces 1400 that may be displayed by a processor on a client computing device. User interface 1400 may include a list of sub-applications icons 1402 that may be available to an authenticated team member which may participate in a remote huddle session. User interface 1400 may be a summary-level view of the data contained in the huddle which the authenticated team member may have joined. Sub applications that may be shown in the user interface 1400 may be one or a combination of text-based, image-based, or numeric-based, and may include but it is not limited to, recognition, morale, announcements, key projects, dates/calendar, field metrics, news feeds, leader standard work, employee sentiment, and customer sentiment, among others. From user interface 1400, an authenticated team member may select a sub-application to be run by the processor, by either click of a mouse, touches on a screen, and voice commands, among others, that may be interpreted by the processor to start execution of the corresponding sub-applications. The number of sub-applications shown to the team member may vary according to the permissions the team member may have. The list of sub-applications icons 1402 may also vary according to the purpose of the meeting and other particular requirements. The size and shape of sub-applications icons 1402 on user interface 1400 may differ from the ones shown, as they may be customized. Additional features that may allow team members to chat, to exit the huddle session, and report problems with the sub-applications, among others may also be available to team members.

Figure 15:
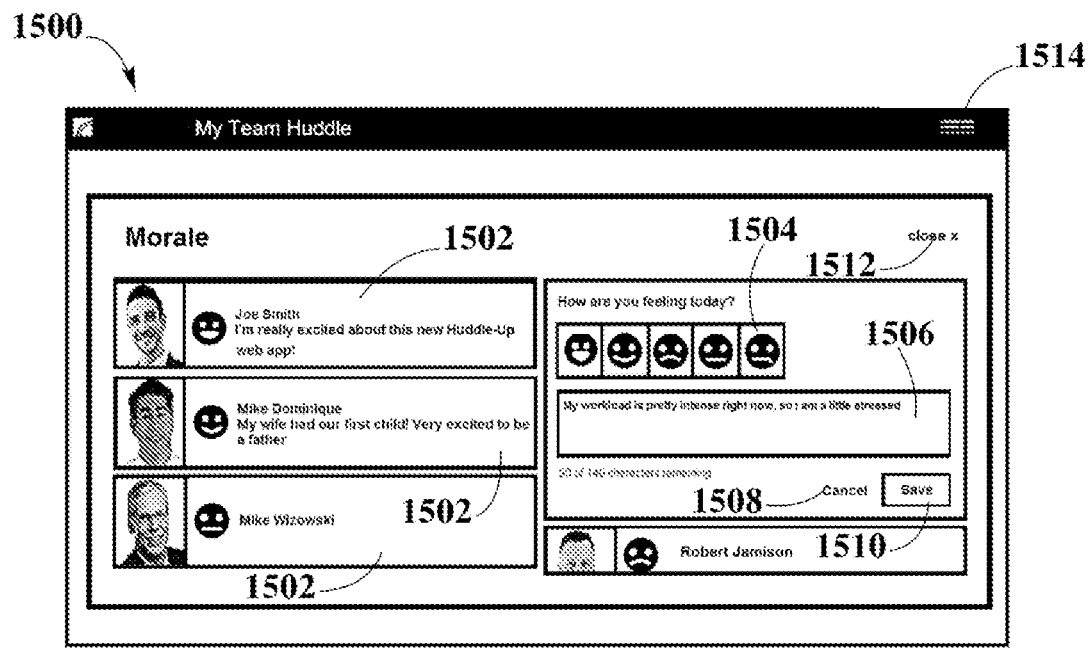
FIG. 15 is an illustration of an exemplary user interface of a morale sub-application, according to another embodiment.

FIG. 15 is an illustration of an exemplary embodiment of a morale sub-application's user interface 1500 that may be displayed by a processor on a client computing device. User interface 1500 of morale sub-application may include a list of morale data 1502 that may be available to an authenticated team member which may participate in a remote huddle session. An authenticated team member may interact with the sub-application through the user interface 1500, by either click of a mouse, touches on a screen, voice commands, and a keyboard, among others, that may be interpreted by the processor to execute specific tasks.

The authenticated team member may select an option to register his/her own morale data 1502, the processor may display a list of smiley images 1504 the authenticated team member may choose from, a text-box 1506, a cancel button 1508, and a save button 1510, among others. The processor may also display a close button 1512 that may be selected by the authenticated team member to close the morale' sub-application. An additional menu 1514 may be available that may provide the authentication with options for additional tasks that the processor may perform.

Figure 16:
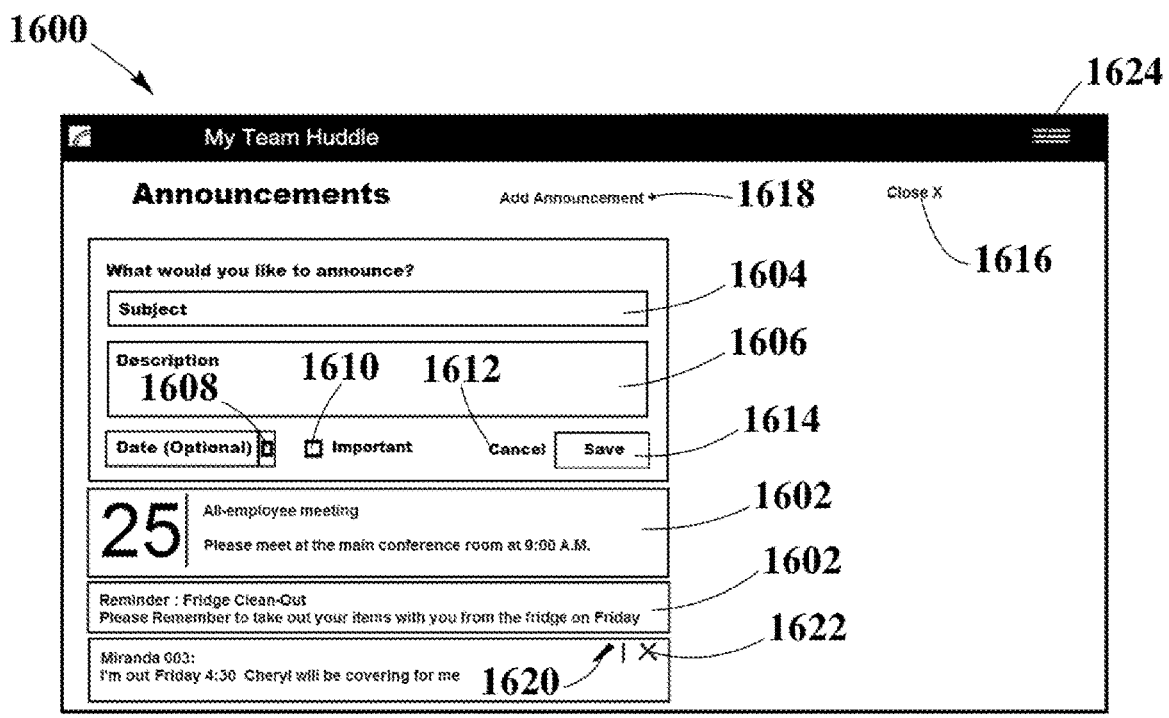
FIG. 16 is an illustration of an exemplary user interface of an announcements sub-application, according to another embodiment.

FIG. 16 is an illustration of an exemplary embodiment of an announcements sub-application's user interface 1600 that may be displayed by a processor on a client computing device. Announcements' sub-application user interface 1600 may include a list of announcement data 1602 that may be available to an authenticated team member which may participate in a remote huddle session. An authenticated team member may interact with the sub-application through by either click of a mouse, touches on a screen, a voice commands, and keyboard, among others, that may be interpreted by the processor to execute specific tasks.

The authenticated team member may select an option to register his/her own announcement data 1602, the processor may display a subject text-box 1604, a description text-box 1606, a date option 1608, a importance check box 1610, cancel button 1612, and a save button 1614, among others. The processor may also display a close button 1616 that may be selected by the authenticated team member to close the morale sum application, an add button 1618 that may be used by the authenticated team member to add a select adding a new announcement, and edit button 1620 that may allow the authenticated team member to edit an announcement, and a delete button 1622 that may allow the authenticated team member to delete an announcement. An additional menu 1624 may be available that may provide the authentication with options for additional tasks that the processor may perform.

Figure 17:
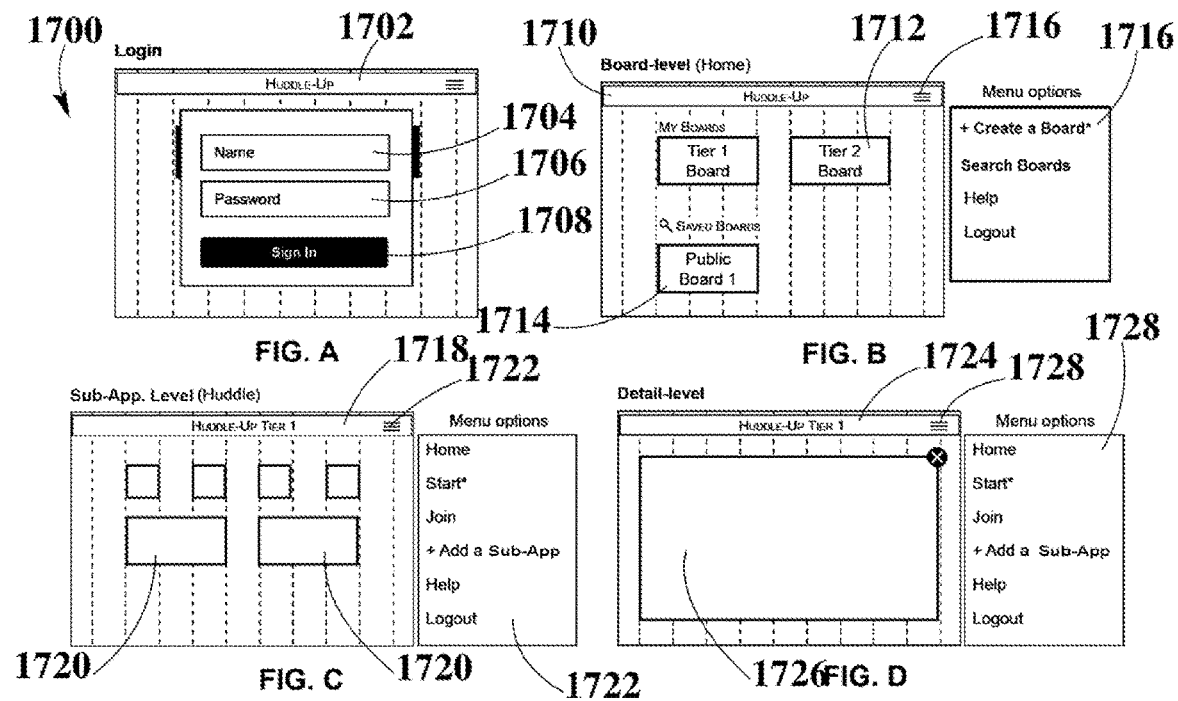
FIG. 17 is an additional exemplary user interface of a home screen, a log in screen, a huddle summary, and a sub-application details, according to another embodiment.

FIG. 17 is an illustration of an exemplary embodiment of user interfaces 1700, which may be displayed by a processor on a client computing device. FIG. 17 may include different figures (FIGS. 17A, B, C, and D) which may describe an interaction to join a huddle session. Specifically, the processor may display a first screen at FIG. 17A, which is an illustration of the log in screen 1702 user interface that a team member may interact with, in order to provide appropriate credentials that may enable him/her to join a remote huddle collaboration environment. A processor may request from the user, a user name 1704, and a password 1706, among other credentials for authentication purposes. The team member may be required to hit the sign in button 1708 for the processor to validate the provided credentials.

Moreover, during a huddle board session, a user screen 1702 may display four sub-applications at a time on the horizontal or vertical screen mode; however, team members may scroll between applications horizontally or vertically revealing more sub-applications, where huddle team leader may customize them. Thus, huddle team leader may Configure the layout, (customize the sub-application in term of size, and location, among others) on the summary view. Specifically, huddle team leader may configure or customize the sub-application that may be located in the front or back of the summary mode view. Team leader may also decide or edit the configuration of the sub-application and content according to relevance or key metrics parameters, among others during a design mode.

Subsequently, after authenticating the team member, the processor may display a home screen 1710, illustrated at FIG. 17B. A team member may interact with home screen 1710 while creating and joining huddle sessions. Home screen 1710 may include public boards 1712 and private boards 1714, which an authenticated team member may choose to join. Additionally, home screen 1710 may include an options menu 1716 that may enable the authenticated team member to create a new huddle board, search for currently available huddle boards, open the online help, and log out of the remote huddle collaboration environment, among others.

Whenever a team member selects any suitable public board 1712 or private board 1714 a huddle summary 1718, such as FIG. 17C, that may be displayed by the processor. Huddle summary 1718 may include sub-applications icons 1720 which an authenticated team member may choose to select. Additionally, huddle summary 1718 may include an options menu 1722 that may enable the authenticated team member to return the home screen, start a huddle session, join a huddle session, add a sub-application to the huddle session, open the online help, and log out of the remote huddle collaboration environment, among others.

Finally, FIG. 17D is an illustration of a user interface of a sub-application detail level 1724, which may be displayed by the processor on the user interface of a client computing device, after a team member has selected a sub application from huddle summary 1718. Sub-application detail level 1724 may include sub-applications details 1726, and an options menu 1728, among others. Options menu 1728 may enable the authenticated team member to return to the home screen, join another huddle session, add a sub-application to the huddle session, open the online help, and log out of the remote huddle collaboration environment, among others.

Figure 18:
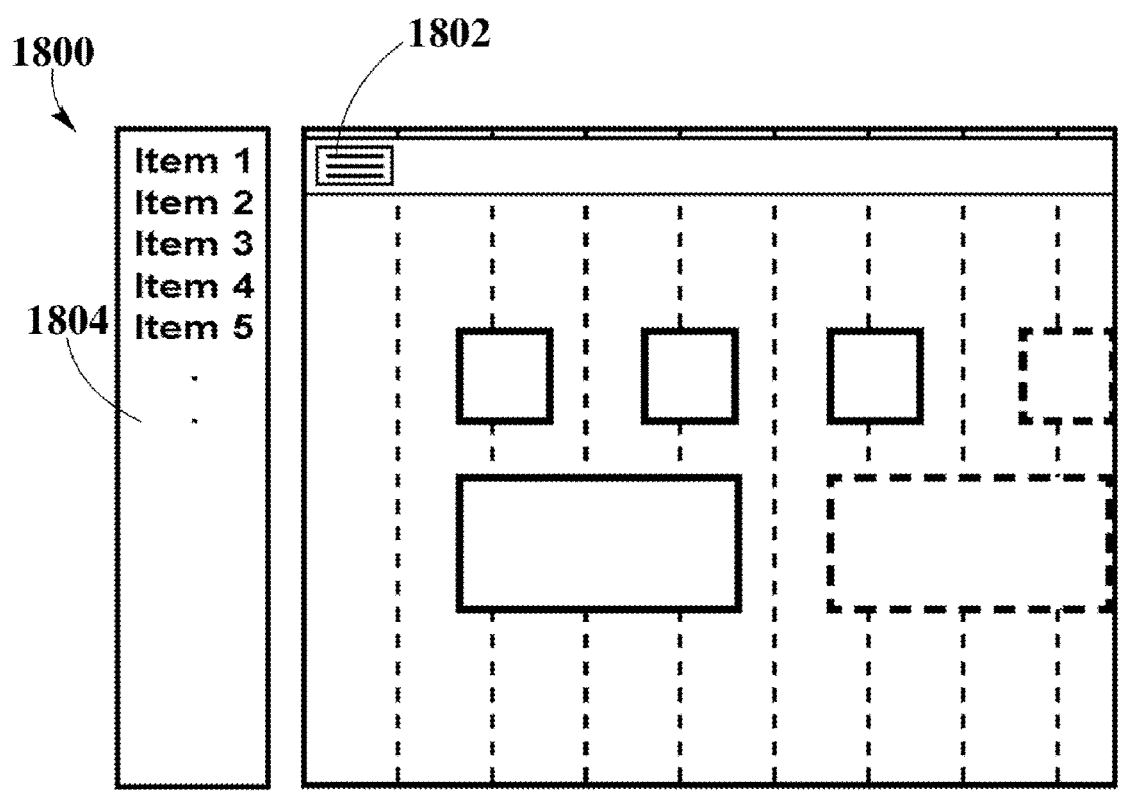
FIG. 18 is an additional exemplary user interface of a menu system, according to another embodiment.

FIG. 18 is an illustration of a user interface 1800 of a menu system 1802, according to another embodiment. Specifically, menu system 1802 icon of a huddle summary (as shown in FIG. 17C) may be displayed by the processor on the user interface of any suitable client computing device, where a team member may interact with after joining a huddle session. Menu system 1802 icon may be located at the upper left or right corner of huddle summary, which may allow team member to select, by clicking on menu system 1802 icon, to show a page contents to the right for revealing menu options 1804 with different items. Menu system 1802 may be manually closed by a team member interacting with huddle summary, and may be automatically closed once a selection over a suitable item has been made.

Example #1 refers to a team member that may join a remote huddle session from a location that is physically separated from the main offices. The team member may employ the processes described in FIG. 3 to authenticate with the huddle management system by specifying credentials. The team member may decide to update his/her morale status, for which the processor may display the details of the morale sub application, as shown in FIG. 15. The team member selects a smiley, types down text that may provide additional information regarding his morale status, and hits save. The huddle management system may store and populate the morale data provided by the team member to the user interface displayed on the computing devices that other team members may use to access the huddle session.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
receiving, by an authentication module of a huddle management server, a user credential of a first user transmitted from a computing device of the first user;
authenticating, by the authentication module of the huddle management server, the user credential of the first user;
determining, by the authentication module of the huddle management server, which huddle collaboration files are associated with the first user;
granting, by the authentication module of the huddle management server, access to the first user for the huddle collaboration files associated with the first user upon authentication of the user credential;
receiving, by a data processing module of the huddle management server, a selection by the user of a huddle collaboration file associated with the first user;
designating, by the data processing module of the huddle management server, the selected huddle collaboration file as an active huddle;
receiving, by the authentication module of the huddle management server, a user credential of a second user transmitted from a computing device of the second user;
authenticating, by the authentication module of the huddle management server, the user credential of the second user;
determining, by the authentication module of the huddle management server, which huddle collaboration files are associated with the second user;
granting, by the authentication module of the huddle management server, access to the second user for the huddle collaboration files associated with the second user upon authentication of the user credential;
determining, by the authentication module of the huddle management server, whether any of the huddle collaboration files associated with the second user are designated as an active huddle;
identifying, by a data processing module of the huddle management server, at least two sub-applications associated with the selected collaboration file designated as the active huddle;
instructing, by the data processing module of the huddle management server, execution of each of the at least two sub-applications associated with the selected collaboration file, wherein each of the sub-applications dynamically queries a database for data records associated with the first and second users;
presenting, by the data processing module of the huddle management server, a graphical representation of the selected huddle collaboration file on the computing device of the first user, wherein the graphical representation comprises an initial view of the at least two sub-applications having a first set of information for each of the at least two sub-applications simultaneously displayed in the graphical representation;
simultaneously presenting, by the data processing module of the huddle management server, a synchronized version of the selected huddle collaboration file on a computing device of the second user located remotely from the computing device of the first user, wherein the graphical representation comprises the initial view of the at least two sub-applications having the first set of information for each of the at least two sub-applications simultaneously displayed in the graphical representation;
upon receiving a selection of one of the at least two sub-applications from the computing device of the first user or the computing device of the second user,
presenting, by the data processing module of the huddle management server, a second graphical representation of the selected huddle collaboration file on the computing device of the first user, wherein the second graphical representation comprises a second view of the selected sub-application having a second set of information associated with the selected sub-application displayed in the second graphical representation; and
simultaneously presenting, by the data processing module of the huddle management server, the second graphical representation of the selected huddle collaboration file on the computing device of the second user, wherein the second graphical representation comprises the second view of the selected sub-application having the second set of information associated with the selected sub-application displayed in the second graphical representation; and upon receiving input data from an input device of the computing device of the first user or the second user directed to an electronic address associated with the selected sub-application, updating, by the data processing module of the huddle management server, the database accessed by the selected sub-application and dynamically display the second graphical user interface simultaneously to the computing device of the first user and the computing device of the second user reflecting the updated database.

2. The computer-implemented method of claim 1, further comprising presenting, by the data processing module of the huddle management server, the input data as an overlay on the first graphical representation or the second graphical representation that was being displayed when the input data was received by the huddle management server upon receiving input data from an input device of the computing device of the first user or the second user.

3. The computer-implemented method of claim 2, further comprising associating, by the data processing module of the huddle management server, the input data with the first graphical representation or the second graphical representation that was being displayed when the input data was received by the huddle management server.

4. The computer-implemented method of claim 1, wherein a sub-application of the at least two sub-applications corresponds to a software tool enabling remote collaboration between users in a digital huddle environment.

5. The computer-implemented method of claim 1, wherein a sub-application of the at least two sub-applications corresponds to an image-based sub-application, wherein the image-based sub-application comprises a library of images for selection by the first user or the second user.

6. The computer-implemented method of claim 1, wherein a sub-application of the at least two sub-applications corresponds to a text-based sub-application, wherein the text-based sub-application comprises a text column of a pre-defined characters for writing by the first user or the second user.

7. The computer-implemented method of claim 1, wherein a sub-application of the at least two sub-applications corresponds to a text-based sub-application, wherein the text-based sub-application comprises a text column for the first user or the second user to publish text for sharing with other user.

8. The computer-implemented method of claim 1, wherein a sub-application of the at least two sub-applications corresponds to a text-based sub-application to provide news and alerts to the first user or the second user during the active huddle.

9. The computer-implemented method of claim 1, wherein a sub-application of the at least two sub-applications corresponds to a fillable calendar application for the first user or the second user to share dates with one another.

10. The computer-implemented method of claim 1, wherein each sub-application of the at least two sub-applications comprises configurable content editable by the first user or the second user upon authorization.

11. The computer-implemented method of claim 1, wherein the huddle collaboration files correspond to records that store information about a huddle board, the at least two sub-applications associated with the huddle board, whether the huddle board is an active huddle board, which of the first user or the second user are associated with the huddle board, any positions or roles of the first user or the second user associated with the huddle board, and information about the look and feel of how to present the huddle board on a display.

12. The computer-implemented method of claim 11, wherein the huddle board corresponds to a display page generated by the huddle management server displaying content collected during a huddle.

13. The computer-implemented method of claim 12, wherein the database stores description associated with the display page of the huddle board having the at least two sub-applications.

14. The computer-implemented method of claim 13, wherein each of the at least sub-applications comprises pre-defined content and has a standard layout in the huddle board, and wherein the pre-defined content is selected from a group consisting of morale field, recognition field, announcements field, company news field, and calendar field.

* * * * *